(12) United States Patent
White

(10) Patent No.: US 12,259,988 B2
(45) Date of Patent: Mar. 25, 2025

(54) SYSTEMS AND METHODS FOR STORING, MANAGING, VERIFYING, AND ACCREDITING DIGITAL DATA

(71) Applicant: Lauretta Zerelda White, Poolesville, MD (US)

(72) Inventor: Lauretta Zerelda White, Poolesville, MD (US)

(*) Notice: Subject to any disclaimer, the term of this patent is extended or adjusted under 35 U.S.C. 154(b) by 0 days.

(21) Appl. No.: 17/865,985

(22) Filed: Jul. 15, 2022

(65) Prior Publication Data

US 2023/0015446 A1 Jan. 19, 2023

Related U.S. Application Data

(60) Provisional application No. 63/222,995, filed on Jul. 17, 2021.

(51) Int. Cl.
| | | |
|---|---|---|
| *G06F 21/62* | (2013.01) | |
| *G06F 16/23* | (2019.01) | |
| *G06F 16/2455* | (2019.01) | |
| *H04L 9/32* | (2006.01) | |

(52) U.S. Cl.
CPC ...... *G06F 21/6218* (2013.01); *G06F 16/2365* (2019.01); *G06F 16/2455* (2019.01); *H04L 9/32* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 7,174,383 B1 * | 2/2007 | Biswas | H04L 63/0815 |
| | | | 709/229 |
| 7,373,372 B1 | 5/2008 | Prpic et al. | |
| 8,975,517 B2 | 3/2015 | Kohda et al. | |
| 9,536,065 B2 * | 1/2017 | Bouse | G06F 21/32 |
| 9,729,576 B2 | 8/2017 | Lang et al. | |
| 9,799,043 B2 | 10/2017 | Jain | |
| 10,453,082 B2 | 10/2019 | Jain | |
| 10,637,669 B2 | 4/2020 | Johnson et al. | |
| 10,885,530 B2 * | 1/2021 | Mercury | G06F 30/20 |
| 11,004,125 B2 | 5/2021 | Barday | |
| 11,042,885 B2 * | 6/2021 | Mercury | G06F 16/2379 |
| 11,134,075 B2 | 9/2021 | Ebrahimi et al. | |

(Continued)

OTHER PUBLICATIONS

R. Ranchal et al., "Protection of Identity Information in Cloud Computing without Trusted Third Party," 2010 29th IEEE Symposium on Reliable Distributed Systems, New Delhi, India, 2010, pp. 368-372. (Year: 2010).*

(Continued)

*Primary Examiner* — Kari L Schmidt

(57) ABSTRACT

Embodiments provide methods and systems for verifying digital data. A method performed by server system to verify the digital data is disclosed. A request is received to verify information associated with a user. The request includes the credentials of the user for a digital platform. It is determined whether the information is present in a database associated with the digital platform. The information is verified by comparing the information with datasets stored in the database upon determining that the information is present in the database. Thereafter, a report is generated based on the verification. The report includes an output of the verification.

16 Claims, 17 Drawing Sheets

(56) References Cited

U.S. PATENT DOCUMENTS

| | | | | |
|---|---|---|---|---|
| 2007/0300148 | A1* | 12/2007 | Aniszczyk | G06F 40/166 715/255 |
| 2009/0307137 | A1 | 12/2009 | White et al. | |
| 2011/0072039 | A1* | 3/2011 | Tayloe | G06F 21/62 707/769 |
| 2012/0116907 | A1* | 5/2012 | Skelton | H04L 67/306 705/26.1 |
| 2012/0311684 | A1* | 12/2012 | Paulsen | H04L 63/0815 726/6 |
| 2014/0165173 | A1* | 6/2014 | Hjelm | H04L 63/08 726/7 |
| 2014/0214932 | A1* | 7/2014 | Kane | H04L 51/52 709/204 |
| 2015/0066867 | A1* | 3/2015 | Vronay | H04L 63/102 707/687 |
| 2015/0163206 | A1* | 6/2015 | McCarthy | G06F 21/6227 726/4 |
| 2017/0142076 | A1* | 5/2017 | Ford | H04L 63/083 |
| 2017/0223001 | A1* | 8/2017 | Haddad | G06Q 30/08 |
| 2017/0317997 | A1* | 11/2017 | Smith | H04L 9/3247 |
| 2018/0063127 | A1* | 3/2018 | Tyagi | H04L 63/102 |
| 2019/0087558 | A1* | 3/2019 | Mercury | H04L 67/131 |
| 2019/0087834 | A1* | 3/2019 | Mercury | G09B 7/00 |
| 2019/0213305 | A1* | 7/2019 | Mercury | G06F 21/45 |
| 2020/0259828 | A1* | 8/2020 | Shaffer | H04L 63/0853 |
| 2020/0314106 | A1* | 10/2020 | Tripathi | H04L 9/0894 |
| 2021/0012254 | A1* | 1/2021 | Campbell | G06Q 30/0185 |
| 2021/0029546 | A1* | 1/2021 | Maufort | H04W 12/06 |
| 2021/0117568 | A1* | 4/2021 | Liu | H04L 63/101 |
| 2021/0281421 | A1* | 9/2021 | Semenovskiy | H04L 9/3231 |
| 2021/0319112 | A1* | 10/2021 | Rae | G06F 8/60 |
| 2021/0398143 | A1 | 12/2021 | Park | |
| 2022/0078005 | A1* | 3/2022 | Lanc | G06F 21/6245 |
| 2022/0255945 | A1* | 8/2022 | Guan | H04L 63/0884 |
| 2022/0309468 | A1* | 9/2022 | Mahajan | G06Q 10/1053 |
| 2022/0345458 | A1* | 10/2022 | Kumarji | H04L 63/102 |
| 2023/0362148 | A1* | 11/2023 | Norcross | H04L 63/08 |

OTHER PUBLICATIONS

Meng Han et al., A Novel Blockchain-based Education Records Verification Solution. In Proceedings of the 19th Annual SIG Conference on Information Technology Education (SIGITE '18). Association for Computing Machinery, New York, NY, USA, 178-183. (Year: 2018).*

* cited by examiner

SYSTEMS AND METHODS FOR STORING, MANAGING, VERIFYING, AND ACCREDITING DIGITAL DATA

TECHNICAL FIELD

The present disclosure relates to processing systems and, more particularly to electronic methods and complex processing systems for storing, managing, verifying, and accrediting digital data.

BACKGROUND

Computerized documents and information (e.g., digital data) are used extensively for verifying or sharing information or record purposes. They are very convenient and can be readily sent from one party to another party. Digital data are often posted onto online portals and websites where they are accessed by the viewing party. In one example scenario, an individual posts their achievements on a web portal of a website that displays the data about an individual's education, credentials, awards, trophies, etc. In another, an individual applies for admission to a higher educational institution for an advanced degree and lists in the application, their undergraduate or lower-level educational achievements. Further, determining the authenticity and credibility of the user-posted information based on the connection of the user to an educational, publishing, scientific or other organization without supporting evidence is time-consuming and unreliable.

In another example scenario, companies hiring employees seek candidates who possess certain educational degrees and/or qualifications. The candidates who apply to these companies provide digital information and documents such as resumes, educational background, work experience, employment status, etc. There's no system to verify, authenticate or evaluate the digital data to generate pre-verified status to enable employers, educational institutions, and companies to expedite the onboarding of potential candidates by eliminating the need to initiate manual requests for authenticated credentials, education, qualifications, or status, thus subjecting the employer to request and await results by mail, fax, or email (i.e., paper) after a hiring decision is made.

Further, for an individual to obtain verified documents or credentials accredited by an educational institution, government body, or business, the individual has to perform a series of telephonic interactions and/or travel to various organizations to perform person-to-person transactions and in some cases, there might be multiple redundant data verifications, collection, storage, paper, postage, courier, equipment, fragmented data sources, etc. which results to time-consuming and inefficient processes, procedures, and resources.

Therefore, there exists a need for techniques to improve the process of verifying, accrediting, managing, sharing, displaying, and storing a plurality of digital data and documents such as professional credentials, educational information, occupational information, employment status, government status, and other identifying information for a plurality of users such as individual users, government users, educational users, and/or business users across a single online platform, in addition to providing other technical advantages.

SUMMARY

Various embodiments of the present disclosure provide systems and methods for storing, managing, verifying, and accrediting digital data.

In an embodiment, a computer-implemented method for authenticating information associated with a user is disclosed. The computer-implemented method performed by a server system includes receiving a request to verify information associated with a user. The request includes credentials of the user for a digital platform. The method includes determining whether the information is present in a database associated with the digital platform. The determination includes querying the database based on the credentials of the user. The method includes verifying the information by comparing the information with datasets stored in the database upon determining that the information is present in the database. Thereafter, the method includes generating a report based on the verification. The report includes an output of the verification.

In another embodiment, a server system is disclosed. The server system includes a communication interface and a memory including executable instructions. The server system also includes a processor communicably coupled to the memory. The processor is configured to execute the instructions to cause the server system, at least in part, to receive a request to verify information associated with a user. The request includes credentials of the user for a digital platform. The server system is caused to determine whether the information is present in a database associated with the digital platform. The determination includes querying the database based on the credentials of the user. Further, the server system is caused to verify the information by comparing the information with datasets stored in the database upon a determination that the information is present in the database. Further, the server system generates a report based on the verification. The report includes an output of the verification.

BRIEF DESCRIPTION OF THE FIGURES

For a more complete understanding of example embodiments of the present technology, reference is now made to the following descriptions taken in connection with the accompanying drawings in which.

Figure 1:
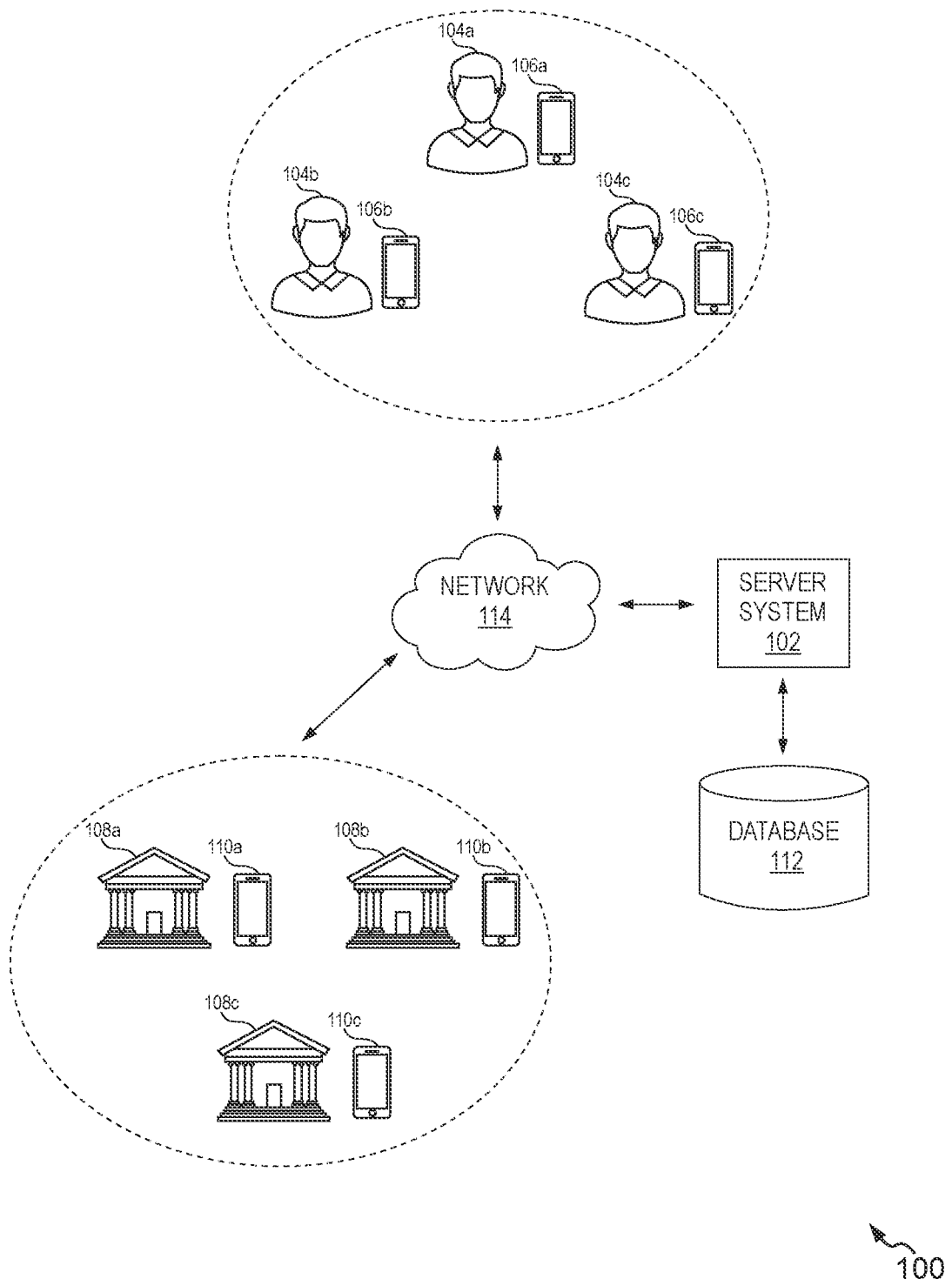
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality, and without imposing limitations upon, the present disclosure.

Embodiments of the present disclosure may be embodied as an apparatus, system, method, or computer program product. Accordingly, embodiments of the present disclosure may take the form of an entire hardware embodiment, an entire software embodiment (including firmware, resident software, micro-code, etc.), or an embodiment combining software and hardware aspects that may all generally be referred to herein as a "circuit," "engine", "module", or "system". Furthermore, aspects of the present disclosure may take the form of a computer program product embodied in one or more computer-readable storage media having computer-readable program code embodied thereon.

The terms "candidate", "user", "employee", and "student" used throughout the description refer to a person who provides information (i.e., digital data) to an organization and the information needs to be verified or accredited.

The terms "entity", "organization", and "requestor" are used interchangeably throughout the description and refer to an organization or an establishment that requests for verification of information provided by the user. In one example, the organization refers to a government organization. In another example, the organization may refer to an organization that has issued the certificates associated with a skillset of the user.

Overview

Various embodiments of the present disclosure provide methods, systems electronic devices, and computer program products for storing, managing, verifying, sharing, and accrediting digital data on a digital platform (i.e., a go verify platform). The go verify platform is provided for digital verification and authentication of digital data (such as certificates, status, qualifications, and licenses) of a user. The platform is provided in the form of a web application or a mobile application. The platform is managed by a server system associated with a service provider. The platform includes multiple portals directed toward multiple organizations. Each portal may include options related to certain requirements of the organization. For example, a portal may be directed towards usage by the government and that portal may include options such as local, state, federal, etc. The government portal may manage and store data related to the employees and volunteers of the government, prospective employees and volunteers, and other individuals. The portal is used to request a verification of data associated with such individuals. The request is associated with the verification of education, credentials, eligibility status, qualifications, and current and previous employment information of an employee, prospective employee, volunteer, or other individuals. The request includes the credentials of the employee for the go verify platform. The server system accesses the database to determine whether the information of the employee is present in the database upon receipt of the request. The server system generates authentication requests for the verification of educational, credentials, qualifications, and employment information if the information is not present in the database. The authentication requests are sent to respective portals of educational, government, and business organizations for authentication of the digital data associated with the user. Upon authentication of the information, the server system receives the output of the authentication and generates a report including the outcome of the authentication. For example, the report may include a positive outcome indicating that the information provided by the employee is true and is verified by the respective organizations.

In one embodiment, the information/data associated with the user may include but is not limited to medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, etc.

In one embodiment, the server system is configured to determine whether the information associated with the user is present in a database. The determination includes querying the database based on the credentials of the user. The credentials may include user ID, password, date of birth, one-time password (OTP), security questions, and the like.

In one embodiment, the server system is configured to verify the information associated with the user based on datasets stored in the database upon determining that the information associated with the user is present in the database. The server system verifies the information associated with the user upon determining that the information is present in the database. The server system verifies the information by cross-examining the details of the information provided with the details of the information stored in the database. In some embodiments, the server system may use natural language processing to cross-examine the details of the information.

In one embodiment, the server system is configured to generate a report based on the verification, the report includes an output of the verification. The server system generates a report including the output of the verification of the information associated with the user. The output of the verification of the information associated with the user is whether the information is valid or invalid. In one embodiment, the server system generates and sends a notification to the user device along with the report based upon the verification of information associated with the user.

Various embodiments of the present disclosure offer multiple advantages and technical effects. For instance, the present disclosure employs multiple strategies to ensure users and organizations utilize a single platform to ease the process of verifying and accrediting digital data associated with the user. The present disclosure employs multiple strategies to ensure a seamless and improved hiring process, and immediate access to a database of pre-verified and pre-qualified/qualified individuals for occupations that require education, licensure, certification, and other requirements. The present disclosure employs multiple strategies to ensure seamless and improved access to verified credentials and education data for school, college, and university admission, scholarship, and additional degrees. The present disclosure employs multiple strategies to ensure seamless and immediate access to a database of verified individuals with entitlements and/or preferences for employment and volunteer service under special hiring authorities. The present disclosure employs multiple strategies to ensure seamless and immediate access to shared verified data across government, corporate and educational agencies and organizations. The present disclosure employs multiple strategies to ensure seamless and immediate access to verified data for promotions, detail assignments, transfers/employment between employers and re-employment/reinstatement of employees. The present disclosure employs multiple strategies to ensure seamless and immediate capability to generate a wide variety of reports including, but not limited to, demographics, statistics, diversity, workforce planning, succession planning, training needs, attrition, educational assessments, skills-gap analyses, emergency employment, budget, etc. The present disclosure employs multiple strategies to ensure significant reduction and/or elimination of errors in qualifications and pre-qualifications determinations for occupations that require education, licensure, certification, and other requirements. The present disclosure employs multiple strategies to ensure significant reduction and/or elimination of errors leading to illegal and erroneous appointments, violations of laws/regulations/policies, and the human and fiscal resources required to correct them. The present disclosure also provides technical advantages such as facilitating the verification of digital data associated with the user and facilitating the generation of resumes based on the verified information. The present disclosure employs multiple strategies to increase the performance and reliability of authenticating digital data.

Various example embodiments of the present disclosure are described hereinafter with reference to FIGS. 1 to 10.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, storing, managing, verifying, and accrediting digital data. The environment 100 corresponds to a go verify system that generally includes a server system 102, a plurality of users 104a, 104b . . . 104n (collectively represented as a user 104), a plurality of user devices 106a, 106b . . . 106n (collectively represented as a user device 106) associated with user 104, a plurality of entities 108a, 108b . . . 108n (collectively represented as an entity 108), a plurality of entity devices 110a, 110b . . . 110n (collectively represented as an entity device 110) associated with the entity 108, a database 112, each coupled to, and in communication with (and/or with access to) a network 114. The portals in the go verify system can be developed using blockchain technology based on user preferences to make the go verify system more secure against online frauds.

The network 114 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among two or more of the parts or user is illustrated in FIG. 1, or any combination thereof. For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Various entities in the environment 100 may connect to the network 114 in accordance with various wired and wireless communication protocols, such as Transmission Control Protocol and Internet Protocol (TCP/IP), User Datagram Protocol (UDP), $2^{nd}$ Generation (2G), $3^{rd}$ Generation (3G), $4^{th}$ Generation (4G), 5th Generation (5G) communication protocols, Long Term Evolution (LTE) communication protocols, future communication protocols or any combination thereof. For example, the network 114 may include multiple different networks, such as a private network made accessible by the server system 102, and a public network (e.g., the Internet, etc.) through which the server system 102 may communicate.

The user 104 may be an individual, student, employee, or any other person. In one example, the user 104 may be an individual who is seeking employment in a company or an organization and may provide documents used for applying for an employment opportunity. In another example, the user 104 may register with a platform managed by the server system and update the user profile including information (such as educational, medical, and previous employment) associated with the user 104. The user 104 may subscribe to the services provided on the digital platform. For example, the user 104 may upload documents in the company's portal through the use of a web interface or mobile application. In another example, the user 104 may send the documents to the organization through email. In one embodiment, the documents may be but are not limited to resume, educational transcripts, experience letter, governmental identification, voter ID, and the like. In one embodiment, the user 104 applies for the employment opportunity and submits the requested digital data to the company or the organization for processing and verification.

The users 104a-104n may have one or more user devices 106a, 106b . . . 106n (collectively, represented as user device 106). The user device 106 is used by the user 104 to apply for employment opportunities and to upload the requested digital data for the respective company or organization. The user 104 may subscribe to a digital platform for verification and management of digital data associated with the user 104. In one embodiment, the user device 106 may be, a smartphone, a tablet, a laptop, a computer system, or any computing device. For example, the user device 106 may be a portable device such as a laptop, smartwatch, PDA (personal digital assistant), smartphone, and the like. In another example embodiment, the user device 106 may be a fixed device such as a desktop, workstation, and the like.

The entity 108 may be representative of a corporate entity, non-profit organization, a company, a private organization, an educational institution, a governmental organization, etc. In one embodiment, the entity 108 may be a company that is looking for onboarding potential candidates into their company. The entity 108 may request the user 104 to submit digital data to expedite onboarding. The entity 108 then uses a platform associated with the server system to verify the digital data and then proceed with the hiring. The platform may include multiple portals associated with different entities. The platform is managed by a service provider associated with the server system. Each portal included in the platform is used by an entity to receive and authenticate information associated with the user 104.

The entities 108a-108n may have one or more entity devices 110a, 110b . . . 110n (collectively, represented as entity device 110). The entity 108 accesses the platform through the use of an entity device 110. The entity 108 may have a portal designed for the requirements of the entity 108. The portal may be accessed through the entity device 110 to request the candidate to upload the digital data and also enroll with the portal included in the platform to verify the credibility of the documents/data. The web interface of the platform including various portals will be explained later in detail with reference to FIG. 10. In one embodiment, the entity device 110 may be, a smartphone, a tablet, a laptop, a desktop, a computer system, or any computing device. In an example, the entity device 110 may include a portable device such as a laptop, smartwatch, PDA (personal digital assistant), smartphone, and the like.

The environment 100 includes the server system 102 that is configured to store, manage, accredit and verify digital data with the respective organizations. Thereafter, the server system 102 is configured to receive a verification request and then the server system 102 verifies the authenticity of the digital data and then stores the verified data in the database in digital and Portable Document Format (PDF) formats. In one embodiment, the server system 102 is configured to receive an accreditation request, and then the server system 102 accredits the digital data and stores the accredited data in the database.

In one embodiment, the server system 102 may provide the accredited and verified digital data stored in the database to the entity 108 upon receiving a request. The server system 102 may be standalone or be configured to interface with existing software programs, systems, and databases of government, business, and educational entities.

In one embodiment, the server system 102 coupled with a database 112 to store information. The database 112 may store the digital data that is verified and authenticated. The database 112 may be incorporated in the server system 102 or may be an individual entity connected to the server system 102 or may be a database stored in cloud storage.

The server system 102 is a separate part of the environment 100 and may operate apart from (but still in communication with, for example, via the network 114) any third-party external servers (to access data to perform the various operations described herein). However, in other embodiments, the server system 102 may be incorporated, in whole or in part, into one or more parts of the environment 100. In addition, the server system 102 should be understood to be embodied in at least one computing device in communication with the network 114, which may be specifically configured, via executable instructions, to perform steps as described herein, and/or embodied in at least one non-transitory computer-readable media.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
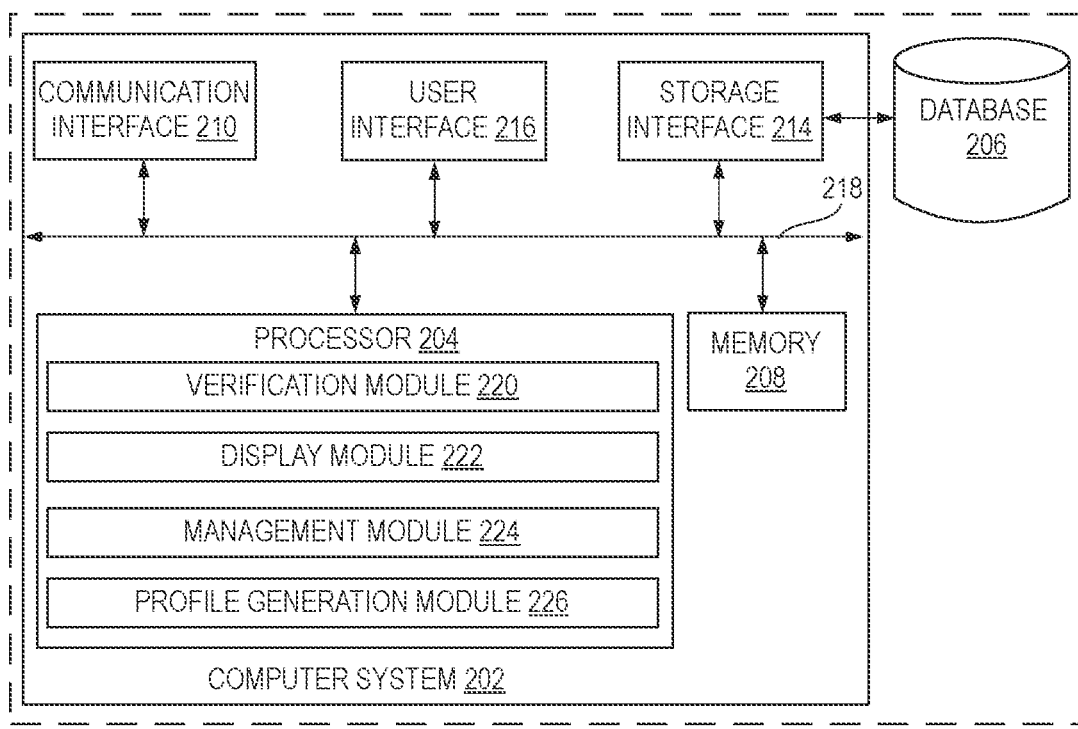
FIG. 2 shows a block diagram of a server system, in accordance with one embodiment of the present disclosure.

FIG. 2 is a simplified block diagram of a server system 200, in accordance with an embodiment of the present disclosure. In some embodiments, the server system 102 is similar to the server system 200. In some embodiments, the server system 102 is embodied as a cloud-based and/or SaaS-based (Software as a Service) architecture. The server system 200 shows the hardware configuration of the server system 102.

In one embodiment, the server system 200 verifies the authenticity of the information associated with the user 104 and generates a report based on the verification. The server system 200 verifies the authenticity of the information upon receiving a request from a go verify user. The server system 200 is configured to host a digital platform for verification and management of the data of users, organizations, educational institutions, and the like. The digital platform may include multiple portals defined for various purposes. Each portal may be adapted and designed for an entity upon subscribing to the digital platform. The information associated with the user 104 may include, but is not limited to, resume, educational transcripts, employment qualifications, certifications, government ID, and the like.

In one embodiment, the server system 200 includes a computer system 202. The computer system 202 includes a processor 204, a database 206, and a memory 208 including computer-readable instructions causing the processor 204 to execute operations of the server system 200.

The computer system 202 includes at least one processor 204 for executing instructions, the memory 208, a communication interface 210, a user interface 216, and a storage interface 214 that communicate with each other via a bus 218.

The processor 204 includes suitable logic, circuitry, and/or interfaces to execute computer-readable instructions for verifying information associated with the user and generating reports based on the verification. Examples of the processor 204 include, but are not limited to, an application-specific integrated circuit (ASIC) processor, a reduced instruction set computing (RISC) processor, a complex instruction set computing (CISC) processor, a graphical processing unit (GPU) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In another embodiment, the memory 208 may be realized in the form of a database server or cloud storage working in conjunction with the server system 200, without departing from the scope of the present disclosure.

In one embodiment, the processor 204 includes a verification module 220, a display module 222, a management module 224, and a profile generation module 226. It should be noted that the components, described herein, can be configured in a variety of ways, including electronic circuitries, digital arithmetic and logic blocks, and memory systems in combination with software, firmware, and embedded technologies.

The verification module 220 includes suitable logic and/or interfaces for accessing information associated with the user from the database 206. In particular, the verification module 220 is configured to verify the authenticity of information associated with a user 104 upon receiving a request for verification of digital data associated with the user. The verification module 220 may query the database 206 associated with the digital platform for checking the presence of pre-verified information related to the user based on an identifier or credentials of the user 104. The verification module 220 verifies the authenticity of the information associated with the user 104 by comparing the information with pre-verified datasets in the database 206. The verification of authenticity is performed upon confirming the presence of pre-verified information related to the user 104 in the database 206. Each dataset may include various details of the user. The pre-verified/authenticated datasets of users corresponding to various institutions are stored in the database 206. For example, a dataset related to a user may include educational background, medical history, employment records, and the like. For example, the information associated with the user is compared with the dataset of the user to verify the authenticity of the information. To that effect, each element of the information is compared with the corresponding element in the dataset, for example, the educational background in the information is compared with the educational background in the dataset or records of one or more organizations.

In one embodiment, the verification module 220 may obtain the user data from the user 104. Further, the verification module 220 verifies the information provided by the user 104 with the datasets available in a database of a particular organization upon receiving a request or a requisition from an organization to verify the information associated with the user 104. For example, an organization X wants to verify the information of a user's previous employment with another organization Y, therefore raises a request for verification of the previous employment information. In one embodiment, the verification module 220 accesses the database of the organization to verify the authenticity of the information provided by the user 104. Upon verification of the digital data related to the user 104, the verified data is stored as a dataset related to the user in the database 206 associated with the digital platform (i.e., go verify platform). The verified data is stored and maintained in the database 206 for the user only when the user has subscribed to the platform. The user 104 may subscribe to the platform under various subscription plans such as basic, standard, premium, and the like.

In one embodiment, the verification module 220 may receive a request from a requestor to access the verified data of a user. The user may be a registered user with a digital platform. The requestor can be an entity or an individual or an employee of the entity, etc. The verification module 220 may determine whether the verified data is stored in the database 206. The verified data may include various details related to the personal (such as medical and identity-related data) and professional (such as education and professional) information of the user. The verification module 220 may query the database 206 to determine the presence of the verified data in the database 206. Upon a determination that the verified data is present in the database 206, the verification module 220 retrieves the verified data and provides the verified data to the requestor. The requestor may download the verified data from the platform in the form of digital documents.

In one embodiment, upon a determination that the verified data is not present in database 206, the verification module 220 may generate authentication requests for the verification of the requisition data. The verification of the data may be performed by the respective user consisting of an individual or a business, government, or educational organization authorized to authenticate some or all portions of the data from any geographic location. Each portion of the data (e.g., college degree, licensure, disability or physical fitness status, duty location, age, school enrollment status, salary, military veteran status, federal employment eligibility or status, job qualifications, etc.) may be authenticated by a user associated with that portion of the data (in one or more of these cases, an individual, business, government, or educational organization). Further, the verification module 220 may forward the authentication requests to portals associated with users authorized to authenticate the data. In cases where the user is not subscribed to the platform, the user will be issued instructions to register with the platform at no cost to authenticate the requested data. Unsubscribed users will also have the ability to utilize the full services of the platform via a paid subscription through the platform's website or by invitation.

The users authenticate the data from the requestors through their respective portals using Machine Learning (ML), Artificial Intelligence (AI), cryptography, zero knowledge encryption, and/or other modern, advanced, and novel software tools in their portals. The data requiring verification already exists with the individuals or organizations in official form which the organizations use to authenticate the data. The requestor is automatically notified by the platform when the authenticated data is sent to the requestor's dedication and/or shared portal. The requestor accesses the data to achieve a plurality of employment and educational needs utilizing the employment, educational, and qualifications functions of the platform. The authenticated data may be viewed and shared in both digital and Printable Document Form (PDF) formats including Section 508 accessibility requirements. A verification status level is added to the individual user's profile on the platform and may be displayed by individual users on social media or virtual reality platforms through a digital badge and Quick-response Code (QR code).

The display module 222 includes suitable logic and/or interfaces for displaying information associated with the user 104 on a user device 106 or on an entity device 110. The display module 222 may further display requisitions by the organizations or by government institutions. In one embodiment, the requisitions may include but are not limited to a) medical, professional, and educational certifications and memberships, b) professional and other licenses, c) transcripts, d) college degrees, e) disability status, f) federal/state/local employment or career status, g) military veteran status, h) job readiness, i) student status, j) occupational pre-qualifications and qualifications, k) training, and l) other demographic and identifying information necessary for verifying, qualifying, pre-qualifying, or identifying individuals for employment, educational programs, licensing, admissions, school/college/university enrollments, degree programs, career-advancement and changes, benefits, and any other government, business, education, or personal purposes.

In one embodiment, the display module 222 may be configured to display reports stored in the form of Portable Document Format (PDF). In some embodiments, the display module 222 may be configured to display information associated with the user 104 on a go verify application present in the user device 106 associated with the user 104 or in the entity device 110 associated with the entity 108.

The management module 224 includes suitable logic and/or interfaces for managing a plurality of portals and accounts associated with the user 104 and the organization 108. The plurality of portals may include but are not limited to the go verify/verification portal, government portal, business portal, education portal, individual portal, and the like. The plurality of portals submit or authenticate requests for verification of information associated with the user 104 including but not limited to credentials, transcripts, foreign education evaluation, pre-qualifications, and resume services within their respective portals and related portals (such as inter and intra-agency portals) through shared portal agreements. The subscription plans may provide access to different portals based on the plan subscribed. For example, the premium plan may provide access to all the portals in the digital platform.

In one embodiment, the management module 224 manages accounts associated with the user 104. The management module 224 also manages requisitions provided by the organizations to verify information associated with the users 104. The accounts associated with the users 104 and the requisitions are accessed and processed through the go verify system portal which consists of a plurality of account management tools including but not limited to, registration, login, user profiles, electronic mail/messages, end-user licenses, billing, requisitions processing, and storage.

The profile generation module 226 includes suitable logic and/or interfaces for creating a resume associated with a user 104. The profile generation module 226 is configured to generate a resume associated with the user 104 upon receiving a requisition for creating or editing the resume. The profile generation module 226 further accesses various information associated with the user 104 and the existing verified information associated with the user 104 from the database and creates or edits a resume based on user inputs.

In one embodiment, if the user 104 is a new user 104 then the system gathers information associated with the user 104 and further verifies it with the organization as described earlier and then creates a resume based on the verified information associated with the user 104. In one embodiment, the verified information may include, but is not limited to (a) medical, professional and educational certifications and memberships (b) professional and other licenses; (c) transcripts (d) college degrees (e) disability status (f) federal/state/local employment or career status (g) military veteran and veterans' preference status (f) job readiness (g) student status (h) occupational pre-qualifications and qualifications (i) training and (j) other demographical and identifying information necessary for verifying, qualifying, pre-qualifying, or identifying individuals for employment, educational programs, licensing, scholarships, college admissions, school enrollment, degree programs, career-advancement and changes, benefits, and any other government, business, education or personal purposes that require verified data.

The user 104 may subscribe to the platform managed by the server system 200. The subscription plans for the platform may include basic, standard, premium, and the like that determine the access limit to various portals and services of the platform by user 104. For example, the basic subscription plan may not include a resume creation tool that is available only in the premium subscription plan. Each subscription plan may have multiple payment cycles during which the subscription plan is active. The payment cycles may be weekly, monthly, quarterly, and annually during which a payment made activates the subscription plan for a certain duration such as a week for weekly and a month for monthly, In some implementations, a single payment (one-time) can be made to get unlimited access to the platform for a lifetime. The services provided with a subscription may include certain benefits including, but not limited to, dedicated account and Portal features; extended data access; year-round reminders, updates, and access to existing verifications such as license and certification expirations; license or certification sanctions, revocation, or disciplinary actions; certain personal civil or criminal actions; resumes; updated education or credentials. Further, an organization may subscribe to the platform and the employees of the organization may be provided access to the platform with certain limitations to the access based on their designations in the organization. For example, employees with lesser designation may get limited access to the platform, however, senior officials may be provided unlimited access to the platform. In another example, an employee may be able to access certain information on the platform, however, all the information on the platform may be available for access to the higher officials of the organization.

In one non-limiting example, the profile generation module 226 processes requisitions for professional resume services and requests for qualification and prequalification determinations for over 2300 Federal and 1000 corporate occupations based on existing verified credentials, education, and/or skills in the go verify system and/or a new request for verification. Further, the processor 204 is configured to generate a report upon completion of the verification of the information associated with a user. The report may include data such as checkboxes or flags to indicate the output of the verification of all the elements of the information. For example, if the educational information of the user is determined as not accurate upon verification, then a flag is enabled or a check box is marked indicating that the verification failed with respect to the educational information in the report.

In an embodiment, upon generating a profile for the user 104 and updating the user profile with information associated with the user 104, the processor 204 is configured to extract certifications that are bound to expire. The processor 204 tracks/monitors the expiry dates of the digital data (such as certificates and licenses) associated with the user. For example, it is identified that a license issued to a user is valid and has an expiry date. The processor 204 tracks/monitors the expiry date of the license. In another embodiment, the processor 204 is configured to track the validity of the subscription of the entity for accessing the platform. For example, an organization A may have a license to use the go verify platform for 1-year and has to renew the license to use the go verify platform upon expiry of the license. In another example, organization A may have subscribed monthly to use the go verify platform with a renewal of the subscription every month. In these cases, the processor 204 tracks the validity of the subscription or license of the user/entity to use the digital platform or portal of the digital platform.

Further, the processor 204 notifies the user through the use of a notification upon detecting that a license or certificate of the user is about to expire. For example, a notification may be sent to the user device or the entity device when an expiry of license or certificate, or subscription is detected and the notification indicates to the user to renew them before expiry.

In an example embodiment, for users subscribed to the digital platform, the processor 204 identifies one or more occupations for which the user pre-qualifies or qualifies based on the verified data. The identification is performed using various machine learning models and artificial intelligence (AI) engines. The identification is performed upon verification of the data related to the user. The processor 204 is configured to issue a notification to the requestor that the verified data and identified occupations are available to view and download. Further, a digital badge may be issued to the requestor to upload to social media platforms.

Figure 3:
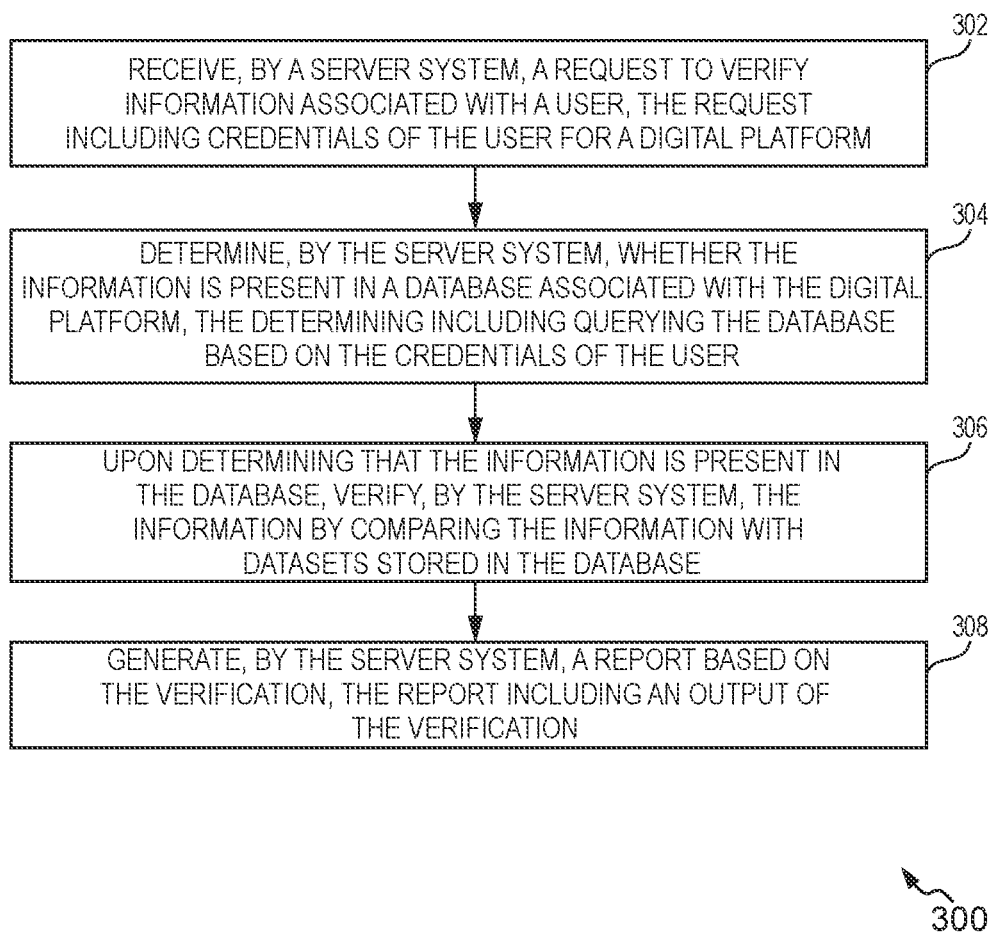
FIG. 3 is a flow chart of a computer-implemented method for verifying information associated with the user, in accordance with an embodiment of the present disclosure.

FIG. 3 is a flow chart of a computer-implemented method 300 for verifying information associated with the user 104, in accordance with an embodiment of the present disclosure. In some embodiments, the method 300 may be used for pre-qualification analyses of the user 104. The method 300 depicted in the flow chart may be executed by, for example, a computer system. The computer system is identical to the server system 200 or the server system 102. Operations of the flow chart of the method 300, and combinations of operations in the flow chart of the method 300, may be implemented by, for example, hardware, firmware, a processor, circuitry, and/or a different device associated with the execution of software that includes one or more computer program instructions. It is noted that the operations of the method 300 can be described and/or practiced by using a system other than these computer systems. The method 300 starts at operation 302.

At operation 302, the server system 102 receives a request to verify information associated with a user 104. The request includes the credentials of the user. For example, an organization may raise a request in their respective portal of the go verify platform to verify information associated with a potential candidate to join their organization. The organization provides the credentials of the user to the server system 102 along with the request. In one embodiment, the information associated with the user 104 may include, but is not limited to medical certifications and memberships, professional certifications and memberships, educational certifications and memberships, and any other government, business, education, or personal purposes.

At operation 304, the server system 102 determines whether the information associated with the user 104 is present in a database. To determine the presence of the information in the database, the server system 102 queries the database based on the credentials of the user 104. The credentials may include user ID, password, date of birth, one-time password (OTP), security questions, and the like. For example, the server system 102 may parse through the datasets in the database to identify the information associated with the user 104 based on login ID or any other parameter. Any other querying methods and parsing can be used to identify and retrieve information from the database.

At operation 306, the server system 102 verifies the information associated with the user 104 based on information stored in the database upon determining that the information associated with the user 104 is present in the database. In one example, the server system 102 may retrieve the information stored in the database upon determining the presence of the information, and the server system 102 compares the information associated with the user and datasets stored in the database. For example, it will be verified whether the educational background of a user present in the database matches with an educational background associated with the user. The server system 200 verifies the information by cross-examining the elements of the information provided with the elements of the information stored in the database. In some embodiments, the server system 200 may use natural language processing to cross-examine the details of the information.

At operation 308, the server system 102 generates a report based on the verification. The report includes an output of the verification. The output of the verification of the information associated with the user 104 indicates whether the information associated with the user 104 is valid or invalid. For example, the report may check boxes and flags that may be marked upon failed verification of the information of the user 104. In one embodiment, the server system 200 generates and sends a notification to the user device 106 along with the report based upon the verification of information associated with the user 104.

Figure 4:
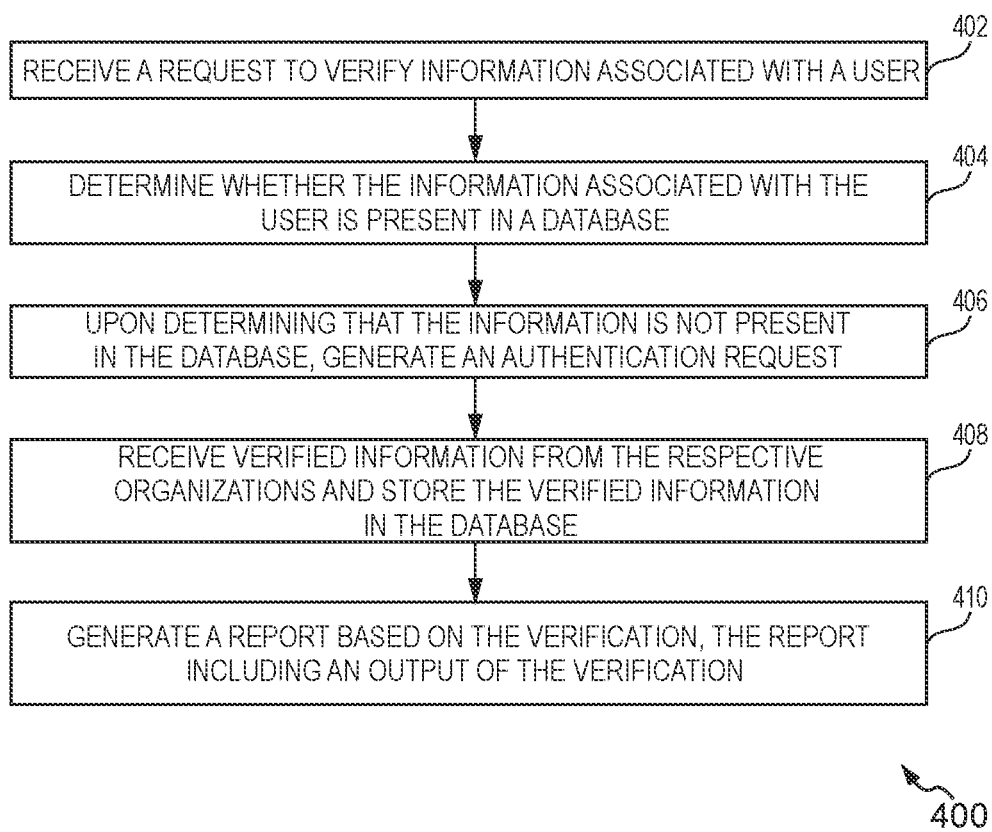
FIG. 4 represents a flowchart for verifying information associated with a user if there's no existing verified information present in the database, in accordance with an embodiment of the present disclosure.

FIG. 4 represents a flowchart 400 for verifying information associated with a user 104 if there's no existing verified record present in the database, in accordance with an embodiment of the present disclosure. In some embodiments, the sequential steps followed here may be used for pre-qualification analyses of the user 104. The sequence of operations of the flowchart 400 may not be necessarily executed in the same order as they are presented. Further, one or more operations may be grouped together and performed in form of a single step, or one operation may have several sub-steps that may be performed in parallel or a sequential manner.

At step 402, the server system 102 receives a request to verify information associated with a user 104, the request including the credentials of the user 104. The organization sends a request to the server system 102 to verify the information provided by the user 104 is valid and correct. The organization provides the credentials of the user 104 to the server system 200 along with the request.

At step 404, the server system 102 determines whether the information associated with the user 104 is present in a database. The step 404 is similar to the step 304 and therefore not explained in detail.

At step 406, the server system 102 generates an authentication request upon determining that the information is not present in the database. The authentication request is generated corresponding to a part of the information associated with the user 104 that needs to be verified. In one embodiment, the authentication request is generated for verification of at least a part of the information associated with the user 104 related to an entity 108. Each part of the information associated with the user has to be verified by the respective entity 108. In one embodiment, the part of the information associated with the user is employment-related information. For example, an authentication request corresponding to the verification of medical history of a user is generated, and a separate authentication request can be generated for verification of the residential address of the user or for verified candidates in a specific geographic location. In another example, a single authentication request may be generated for verification of the complete information associated with the user 104. In case of multiple authentication requests, each request may be generated for verification of part of the information by the corresponding organization.

In one embodiment, the organization may be one of: an educational institution, a foreign education evaluator, a board of medical specialists, a professional designation organization, and the like. The organization refers to a body that verifies and authenticates the information. In one embodiment, the educational institution may authenticate the educational details of the user 104, the foreign education evaluator may authenticate foreign education evaluation, the board of medical specialists may authenticate medical specialty and subspecialty, and the professional designation organization may authenticate professional license, certification, or membership, and a business or government entity may authenticate personal identification information, governmental identification information and the like. In one embodiment, the server system 102 enables the display of the authentication request on a portal associated with the entity 108.

At step 408, the server system 102 receives verified information from the respective organizations and stores the verified information in the database. The server system 102 updates the request upon receiving the verified information. In some embodiments, the request may be a requisition from an organization. In another embodiment, during pre-qualification analyses, if the information associated with the user 104 is verified to be valid, then the server system 200 conducts a pre-qualification analysis of the information and then stores the verified information in the database before updating the request.

At step 410, the server system 102 generates a report based on the verification. The report includes an output of the verification. The step 410 is similar to the step 308 and therefore not explained in detail for the sake of brevity.

Figure 5A:
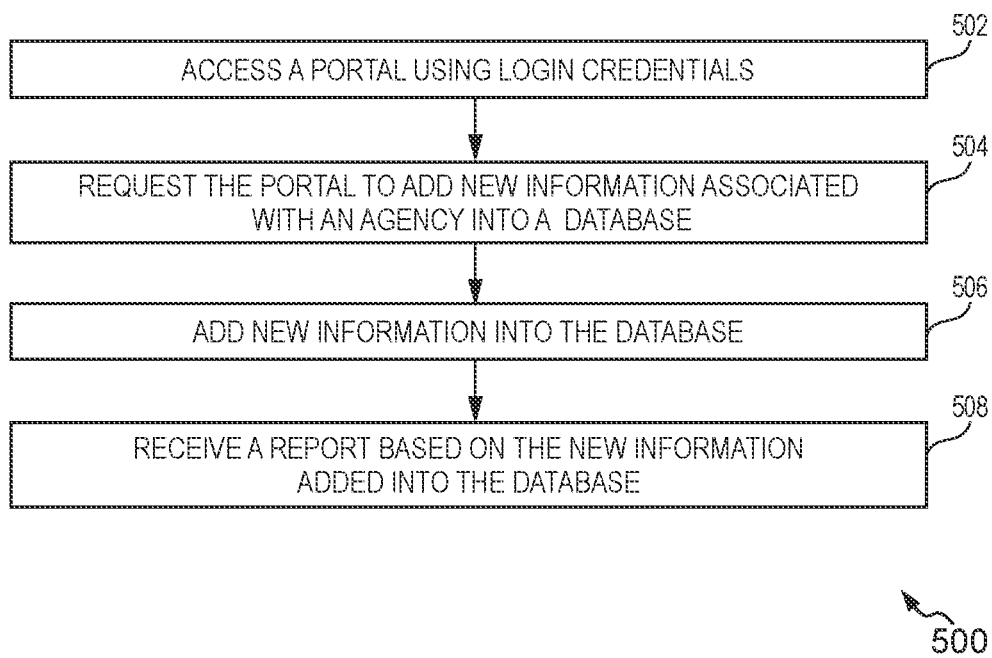
FIGS. 5A-5F show exemplary flowcharts for customized requests or requisitions of a plurality of organizations for adding new information to the database, in accordance with an embodiment of the present disclosure.

FIGS. 5A-5F show exemplary flowcharts for customized requests or requisitions of a plurality of organizations for adding new information to the database, in accordance with an embodiment of the present disclosure. FIG. 5A is a flowchart 500 for a customized request by an inter-agency for adding new information to the database, in accordance with an embodiment of the present disclosure. The sequence of operations of the flowchart 500 may not be necessarily executed in the same order as they are presented. Further, one or more operations may be grouped and performed in form of a single step, or one operation may have several sub-steps that may be performed in parallel or a sequential manner.

At step 502, a requestor (such as the user 104 or the entity 108) accesses a portal using login credentials. The requestor accesses the portal through a webpage or a mobile application. The portal accessed by the requestor is hosted by the server system 200. The portal may be one of the portals included in a go verify platform. In one embodiment, the requestor is an organization or an agency that requests verification of information associated with the user 104. The login credentials may include user ID, password, date of birth, one-time password (OTP), security questions, and the like.

At step 504, the requestor requests the portal to add new information associated with an agency into a database. The new information associated with the agency is the information provided by the users 104 to the agency. The information provided by the user 104 may include, but is not limited to, medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes. In one embodiment, the requestor requests to update the information already present in the database.

At step 506, the portal adds new information to the database. The server system 102 associated with the portal queries the database before adding the new information to the database. The server system 102 checks if the new information is already present in the database and then adds new information to the database. In one embodiment, the server system 102 updates the already existing information present in the database upon receiving a request to update the information.

At step 508, the requestor receives a report based on the new information added to the database. The report includes a summarized list of existing and newly added information present in the database, data and time of information added and updated, etc.

Figure 5B:
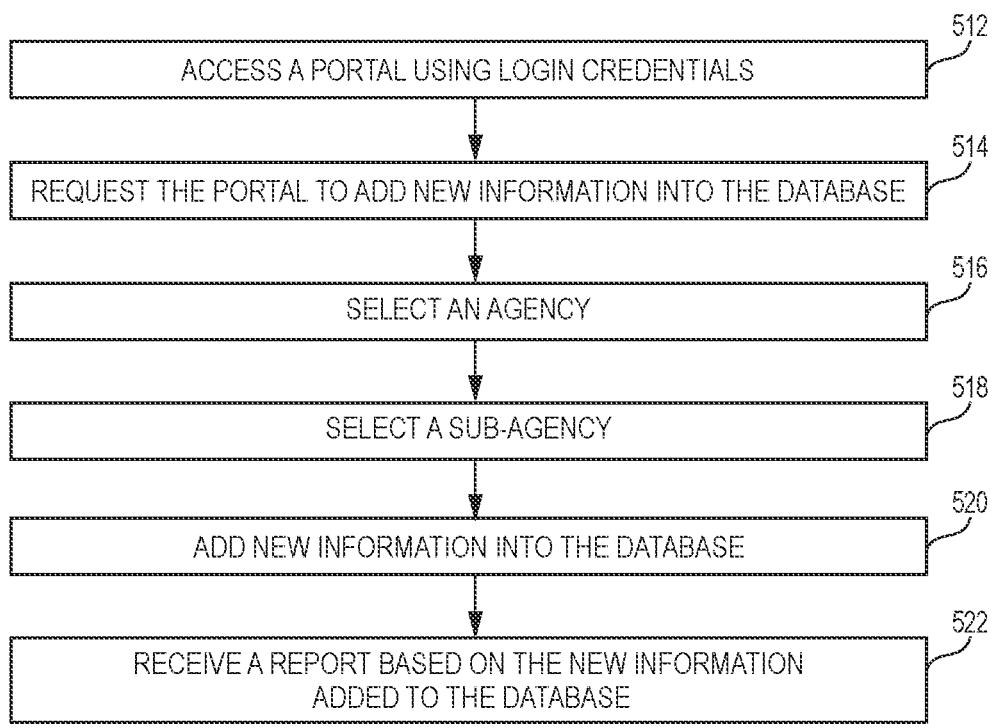

FIG. 5B is a flowchart 510 for a customized request by an intra-agency for information to the database, in accordance with an embodiment of the present disclosure. The sequence of operations of the flowchart 510 may not be necessarily executed in the same order as they are presented. Further, one or more operations may be grouped and performed in form of a single step, or one operation may have several sub-steps that may be performed in parallel or a sequential manner.

At step 512, a requestor accesses a portal using login credentials. The requestor accesses the portal through a webpage or a mobile application. The portal is hosted by the server system 102. In one embodiment, the requestor is an organization or an agency that requests verification of information associated with the user 104. The login credentials may include user ID, password, date of birth, one-time password (OTP), security questions, and the like.

At step 514, the requestor requests the portal to add new information associated with an agency into a database. The new information associated with the agency is the information provided by the users 104 to the agency. The information provided by the user 104 may include but is not limited to medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes. In one embodiment, the requestor requests to update the information already present in the database.

At step 516, the requestor selects an agency. The requestor selects the type of agency on the portal hosted by the server system 102.

At step 518, the requestor selects a sub-agency. The requestor selects the type of the sub-agency on the portal hosted by the server system 102.

At step 520, the server system 102 adds new information to the database. The server system 200 associated with the portal queries the database and adds the new information to the database under the selected sub-agency. The server system 102 checks if the new information is already present in the database and then adds new information to the database. In one embodiment, the server system 102 updates the already existing information present in the database upon receiving a request to update the information.

At step 522, the requestor receives a report based on the new information added to the database. The report includes a summarized list of existing and newly added information present in the database, data and time of information added and updated, etc.

Figure 5C:
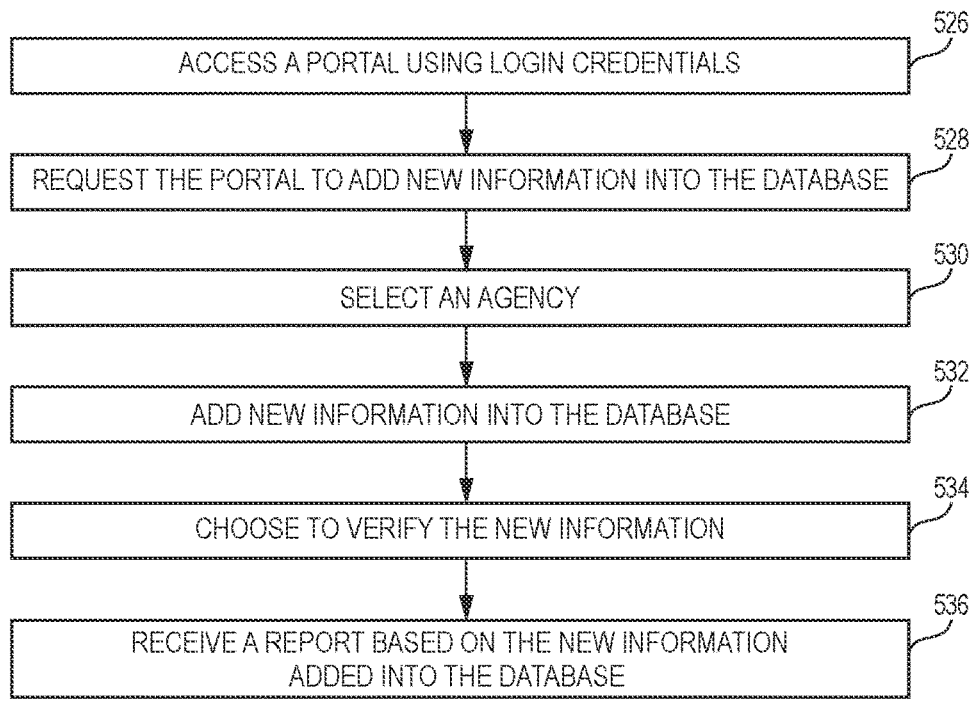

FIG. 5C is a flowchart 524 for a customized request by an agency for adding new information to the database, in accordance with an embodiment of the present disclosure. The sequence of operations of the flowchart 524 may not be necessarily executed in the same order as they are presented. Further, one or more operations may be grouped and performed in form of a single step, or one operation may have several sub-steps that may be performed in parallel or a sequential manner.

At step 526, a requestor accesses a portal using login credentials. The requestor accesses the portal through a webpage or a mobile application. The portal is hosted by the server system 102. In one embodiment, the requestor is an organization or an agency that requests verification of information associated with the user 104. The login credentials may include user ID, password, date of birth, one-time password (OTP), security questions, and the like.

At step 528, the requestor requests the portal to add new information associated with an agency into a database. The new information associated with the agency is the information provided by the users 104 to the agency. The information provided by the user 104 may include, but is not limited to, medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes. In one embodiment, the requestor requests to update the information already present in the database.

At step 530, the requestor selects an agency. The requestor selects the type of agency on the portal hosted by the server system 102.

At step 532, the portal adds new information to the database. The server system 102 associated with the portal queries the database into adding the new information to the database under the selected sub-agency. The server system 102 reviews if the new information is already present in the database and then queries into adding new information to the database. In one embodiment, the portal associated with the server system 102 updates the already existing information present in the database upon receiving a request to update the information.

At step 534, the requestor chooses to verify the new information. The server system 102 verifies the authenticity and the credibility of the new information with the organization associated with the information.

At step 536, the requestor receives a report based on the new information added to the database. The report includes a summarized list of existing and the newly added information present in the database, data and time of information added and updated, etc.

Figure 5D:
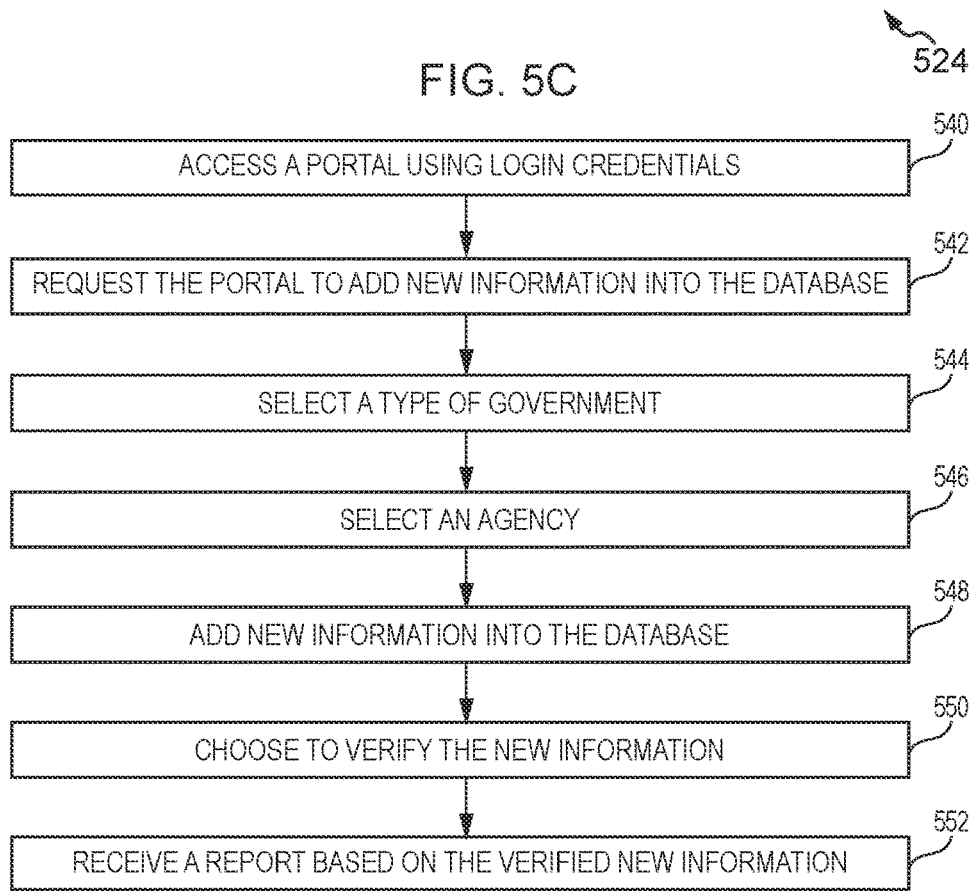

FIG. 5D is a flowchart 538 for a customized request by a government agency for adding new information to the database, in accordance with an embodiment of the present disclosure. The sequence of operations of the flowchart 538 may not be necessarily executed in the same order as they are presented. Further, one or more operations may be grouped and performed in form of a single step, or one operation may have several sub-steps that may be performed in parallel or a sequential manner.

At step 540, a requestor accesses a portal using login credentials. The requestor access the portal through a webpage or a mobile application. The portal is hosted by the server system 102. In one embodiment, the requestor is an organization or an agency that requests verification of information associated with the user 104. The login credentials may include user ID, password, date of birth, one-time password (OTP), security questions, and the like.

At step 542, the requestor requests the portal to add new information associated with an agency into a database. The new information associated with the agency is the information provided by the users 104 to the agency. The information provided by the user 104 may include, but is not limited to, medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes. In one embodiment, the requestor requests to update the information already present in the database.

At step 544, the requestor selects a type of government. The requestor selects the type of government on the portal hosted by the server system 102. In one embodiment, the type of government may include DC, Federal, Local, and State.

At step 546, the requestor selects an agency. The requestor selects the type of agency under the type of government selected on the portal hosted by the server system 102.

At step 548, the portal adds new information to the database. The server system 102 queries the database and adds the new information to the database under the selected agency. The server system 102 reviews if the new information is already present in the database and then adds new information to the database. In one embodiment, the server system 102 updates the already existing information present in the database upon receiving a request to update the information.

At step 550, the requestor chooses to verify the new information. The server system 102 verifies the authenticity and the credibility of the new information with the organization associated with the information.

At step 552, the requestor receives a report based on the new information added to the database. The report includes a summarized list of existing and newly added information present in the database, data and time of information added and updated, etc.

Figure 5E:
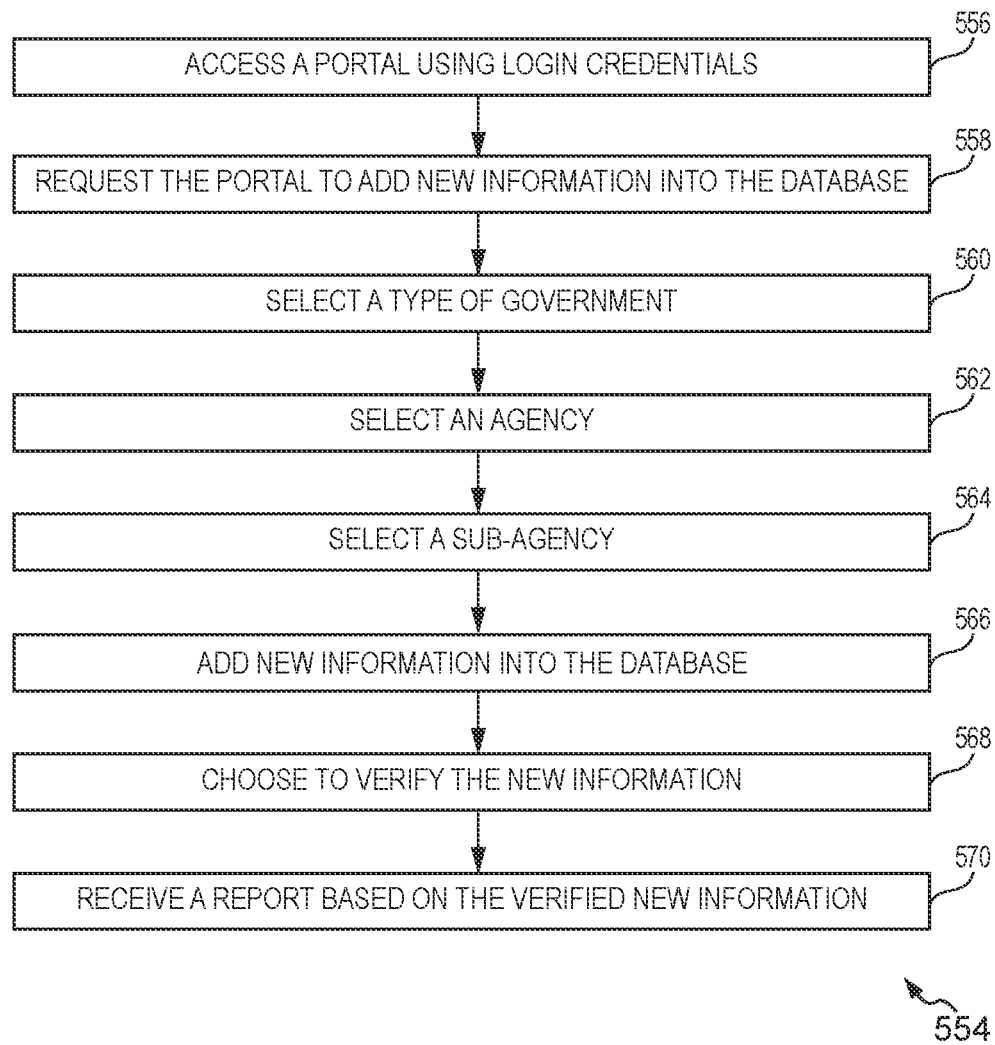

FIG. 5E is a flowchart 554 for a customized request by a government sub-agency for adding new information to the database, in accordance with an embodiment of the present disclosure. The sequence of operations of the flowchart 554 may not be necessarily executed in the same order as they are presented. Further, one or more operations may be grouped and performed in form of a single step, or one operation may have several sub-steps that may be performed in parallel or a sequential manner.

At step 556, a requestor accesses a portal using login credentials. The requestor accesses the portal through a webpage or a mobile application. The portal accessed by the requestor is hosted by the server system 102. In one embodiment, the requestor is an organization or an agency that requests verification of information associated with the user 104. The login credentials may include user ID, password, date of birth, one-time password (OTP), security questions, and the like.

At step 558, the requestor requests the portal to add new information associated with an agency into a database. The new information associated with the agency is the information provided by the users 104 to the agency. The information provided by the user 104 may include, but not limited to, medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes. In one embodiment, the requestor requests to update the information already present in the database.

At step 560, the requestor selects a type of government. The requestor selects the type of government on the portal hosted by the server system 102. In one embodiment, the type of government may include DC, Federal, Local, and State.

At step 562, the requestor selects an agency. The requestor selects the type of the agency under the type of government selected on the portal hosted by the server system 102.

At step 564, the requestor selects a sub-agency. The requestor selects the type of the sub-agency on the portal hosted by the server system 102.

At step 566, the portal adds new information to the database. The server system 102 associated with the portal queries the database into adding the new information to the database under the selected agency. The server system 102 reviews if the new information is already present in the database and then queries into adding new information to the database. In one embodiment, the portal associated with the server system 102 updates the already existing information present in the database upon receiving a request to update the information.

At step 568, the requestor chooses to verify the new information. The server system 102 verifies the authenticity and the credibility of the new information with the organization associated with the information.

At step 570, the requestor receives a report based on the new information added to the database. The report includes a summarized list of existing and the newly added information present in the database, data and time of information added and updated, etc.

Figure 5F:
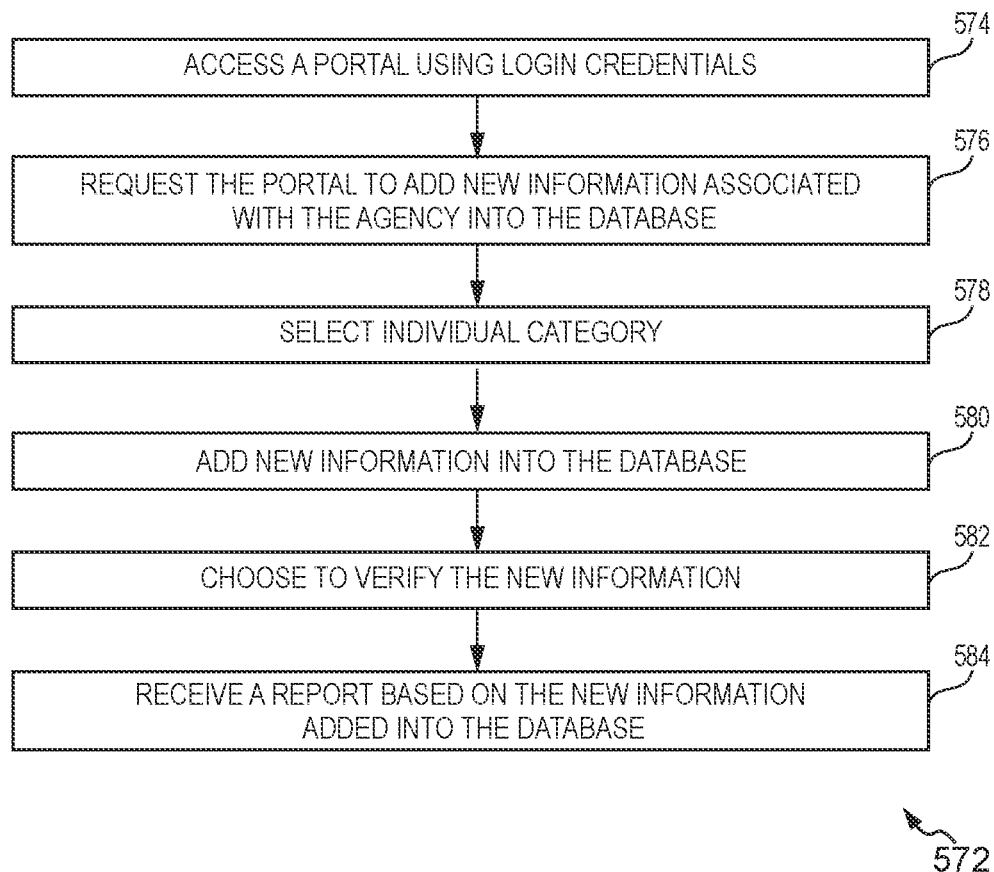

FIG. 5F is a flowchart 572 for a customized request by an individual for adding new information to the database, in accordance with an embodiment of the present disclosure. The sequence of operations of the flowchart 572 may not be necessarily executed in the same order as they are presented. Further, one or more operations may be grouped and performed in form of a single step, or one operation may have several sub-steps that may be performed in parallel or a sequential manner.

At step 574, a requestor accesses a portal using login credentials. The requestor accesses the portal through a webpage or a mobile application by signing up with the portal and using login credentials to log into the portal. The portal accessed by the requestor is hosted by the server system 102. In one embodiment, the requestor is an individual who requests verification of information associated with the user 104. The login credentials may include user ID, password, date of birth, one-time password (OTP), security questions, and the like.

At step 576, the requestor requests the portal to add new information associated with an agency into a database. The new information associated with the agency is the information provided by the users 104 to the agency. The information provided by the user 104 may include, but not limited to, medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes. In one embodiment, the requestor requests to update the information already present in the database.

At step 578, the requestor selects an individual category. The requestor selects the individual category on the portal hosted by the server system 102. The individual category represents the individual person with requisitions for the government.

At step 580, the portal adds new information to the database. The server system 200 queries the database and adds the new information to the database under the selected sub-agency. The server system 102 reviews if the new information is already present in the database and then adds new information to the database. In one embodiment, the portal associated with the server system 102 updates the already existing information present in the database upon receiving a request to update the information.

At step 582, the requestor chooses to verify the new information. The server system 102 verifies the authenticity and the credibility of the new information with the organization associated with the information.

At step 584, the requestor receives a report based on the new information added to the database. The report includes a summarized list of existing and newly added information present in the database, data and time of information added and updated, etc.

Figure 6A:
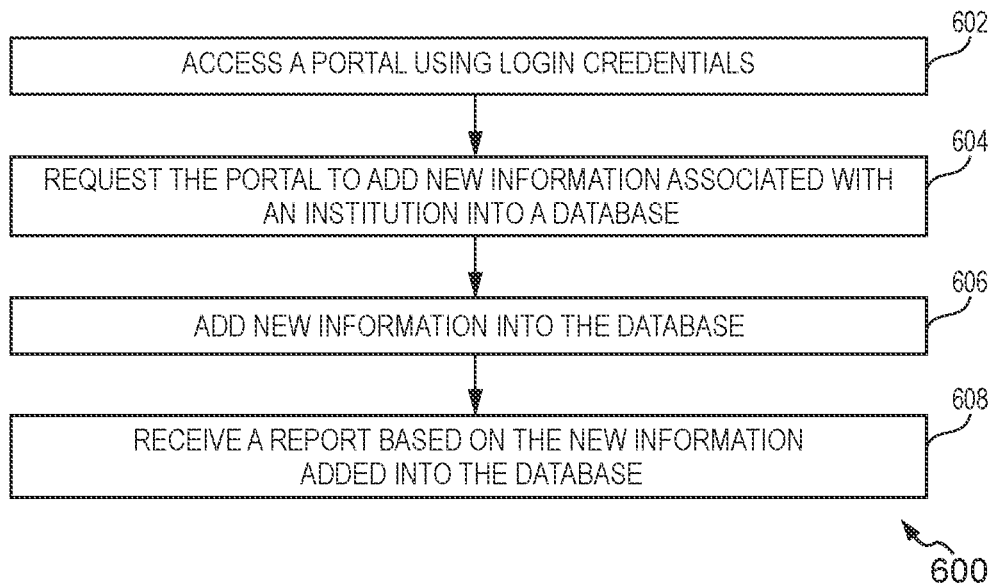
FIGS. 6A-6C show exemplary flowcharts for customized requests or requisitions of an institution for adding new information to the database, in accordance with an embodiment of the present disclosure.
Figure 6B:
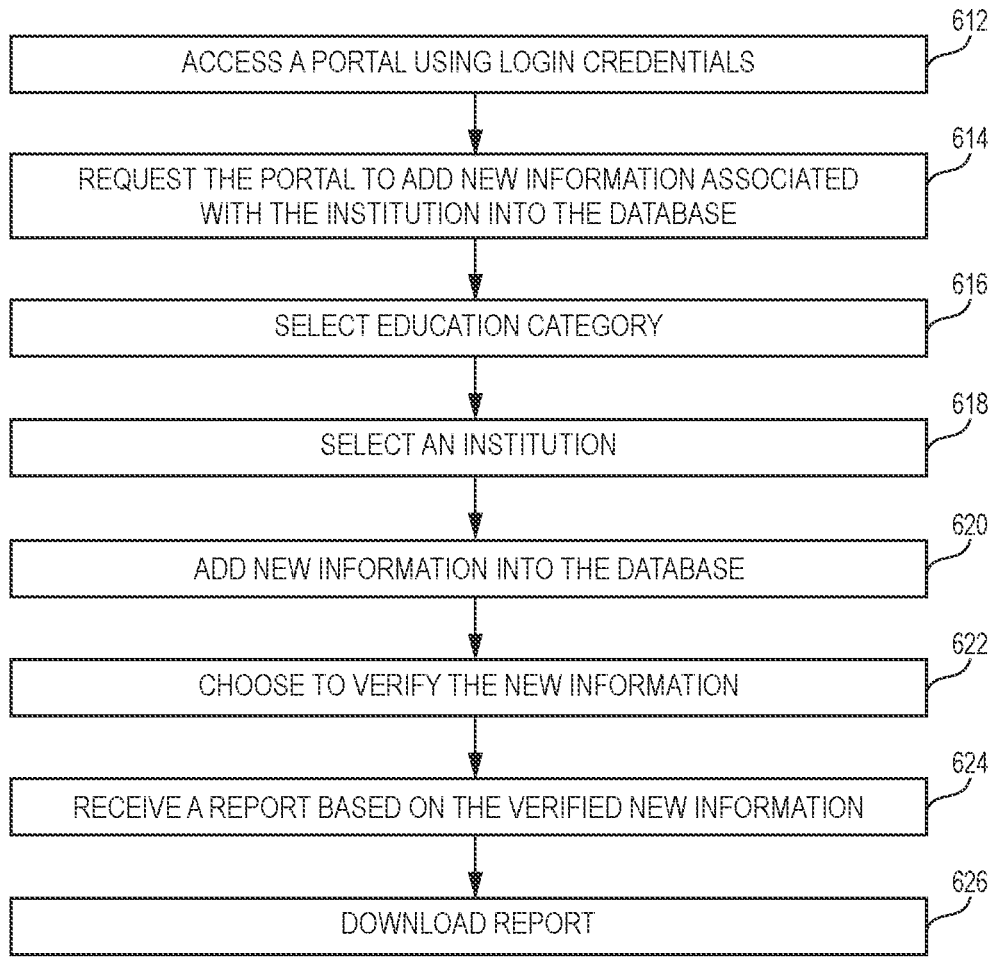
Figure 6C:
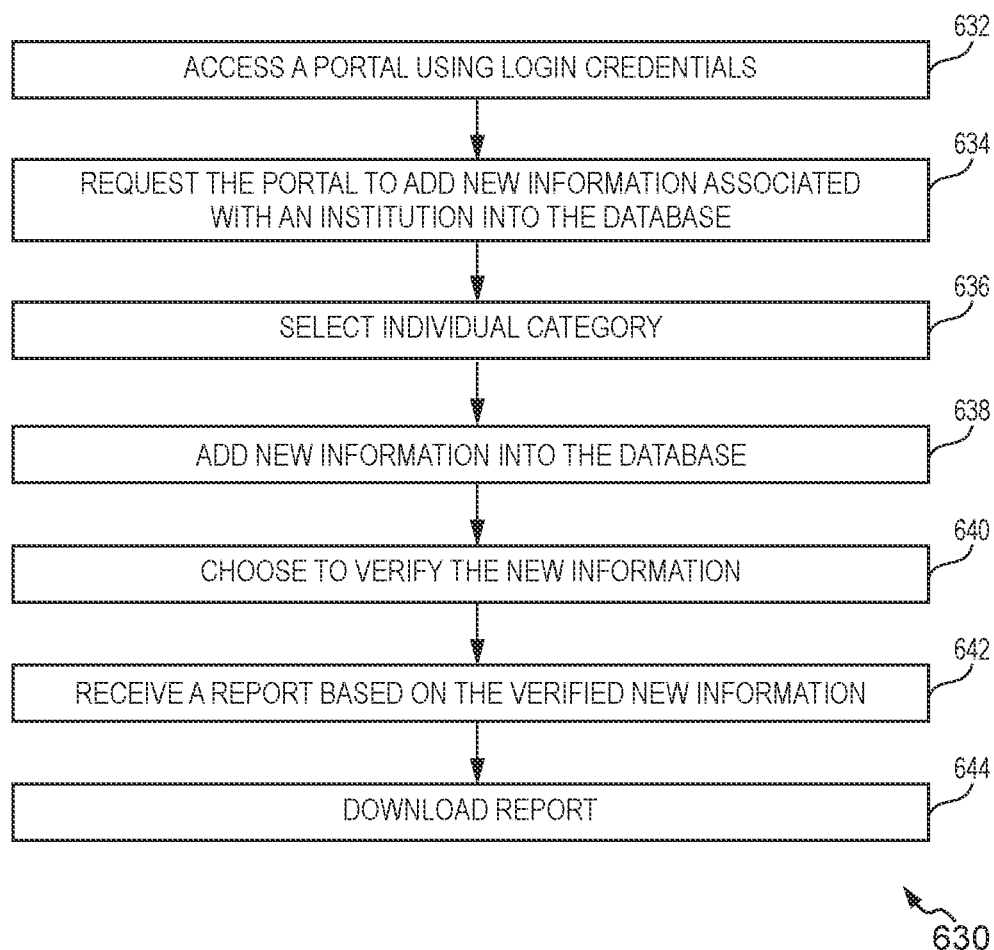

FIGS. 6A-6C show exemplary flowcharts for customized requests or requisitions of an institution for adding new information to the database, in accordance with an embodiment of the present disclosure. FIG. 6A is a flowchart 600 for a customized request by an intra-institution for adding new information to the database, in accordance with an embodiment of the present disclosure. The sequence of operations of the flowchart 600 may not be necessarily executed in the same order as they are presented. Further, one or more operations may be grouped and performed in form of a single step, or one operation may have several sub-steps that may be performed in parallel or a sequential manner.

At step 602, a requestor accesses a portal using login credentials. The requestor access the portal through a webpage or a mobile application. The portal accessed by the requestor is hosted by the server system 102. In one embodiment, the requestor is an institution that requests verification of information associated with the user 104. The login credentials may include user ID, password, date of birth, one-time password (OTP), security questions, and the like.

At step 604, the requestor requests the portal to add new information associated with an institution into a database. The new information associated with the institution is the information provided by the users 104 to the institution. In one embodiment, the institution may be an educational institution. The information provided by the user 104 may include, but is not limited to, medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes. In one embodiment, the requestor requests to update the information already present in the database.

At step 606, the portal adds new information to the database. The server system 102 queries the database into adding the new information to the database. The server system 102 reviews if the new information is already present in the database and then adds new information to the database. In one embodiment, the portal associated with the server system 102 updates the already existing information present in the database upon receiving a request to update the information.

At step 608, the requestor receives a report based on the new information added to the database. The report includes a summarized list of existing and the newly added information present in the database, data and time of information added and updated, etc.

FIG. 6B is a flowchart 610 for a customized request by an inter-institution for adding new information to the database, in accordance with an embodiment of the present disclosure. The sequence of operations of the flowchart 610 may not be necessarily executed in the same order as they are presented. Further, one or more operations may be grouped and performed in form of a single step, or one operation may have several sub-steps that may be performed in parallel or a sequential manner.

At step 612, a requestor accesses a portal using login credentials. The requestor accesses the portal through a webpage or a mobile application. The portal is hosted by the server system 102. In one embodiment, the requestor is an institution that requests verification of information associated with the user 104. The login credentials may include user ID, password, date of birth, one-time password (OTP), security questions, and the like.

At step 614, the requestor requests the portal to add new information associated with the institution to the database. The new information associated with the institution is the information provided by the user 104 to the institution. The information provided by the user 104 may include, but not limited to, medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes. In one embodiment, the requestor requests to update the information already present in the database.

At step 616, the requestor selects an education category. The requestor selects the type of the education category on the portal hosted by the server system 102.

At step 618, the requestor selects an institution. The requestor selects the type of institution on the portal hosted by the server system 102.

At step 620, the portal adds new information to the database. The server system 102 associated with the portal queries the database and adds the new information to the database under the selected institution. The server system 102 reviews if the new information is already present in the database and then adds new information to the database. In one embodiment, the portal associated with the server system 102 updates the already existing information present in the database upon receiving a request to update the information.

At step 622, the requestor chooses to verify the new information. The server system 102 verifies the authenticity and the credibility of the new information with the institution associated with the information.

At step 624, the requestor receives a report based on the new information added to the database. The report includes a summarized list of existing and the newly added information present in the database, data and time of information added and updated, etc.

At step 626, the requestor downloads the report. The requestor downloads the report from the portal onto their systems. In one embodiment, the requestor downloads the report from the portal into their account present in the server system 102.

FIG. 6C is a flowchart 630 for a customized request by an individual for adding new information to the database, in accordance with an embodiment of the present disclosure. The sequence of operations of the flowchart 630 may not be necessarily executed in the same order as they are presented. Further, one or more operations may be grouped and performed in form of a single step, or one operation may have several sub-steps that may be performed in parallel or a sequential manner.

At step 632, a requestor accesses a portal using login credentials. The requestor accesses the portal through a webpage or a mobile application by signing up with the portal and using login credentials to log into the portal. The portal accessed by the requestor is hosted by the server system 102. In one embodiment, the requestor is an individual who requests verification of information associated with the user 104. The login credentials may include user ID, password, date of birth, one-time password (OTP), security questions, and the like.

At step 634, the requestor requests the portal to add new information associated with an institution to the database. The new information associated with the institution is the information provided by the user 104 to the institution. The information provided by the user 104 may include, but not limited to, medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes. In one embodiment, the requestor requests to update the information already present in the database.

At step 636, the requestor selects an individual category. The requestor selects the individual category on the portal hosted by the server system 102. The individual category represents the individual person with requisitions for the institution.

At step 638, the portal adds new information to the database. The server system 102 associated with the portal queries the database into adding the new information to the database. The server system 102 reviews if the new information is already present in the database and then queries into adding new information to the database. In one embodiment, the portal associated with the server system 102 updates the already existing information present in the database upon receiving a request to update the information.

At step 640, the requestor chooses to verify the new information. The server system 102 verifies the authenticity and the credibility of the new information with the institution associated with the information.

At step 642, the requestor receives a report based on the new information added to the database. The report includes a summarized list of existing and newly added information present in the database, data and time of information added and updated, etc.

At step 644, the requestor downloads the report. The requestor downloads the report from the portal onto their systems. In one embodiment, the requestor downloads the report from the portal into their account present in the server system 200.

Figure 7A:
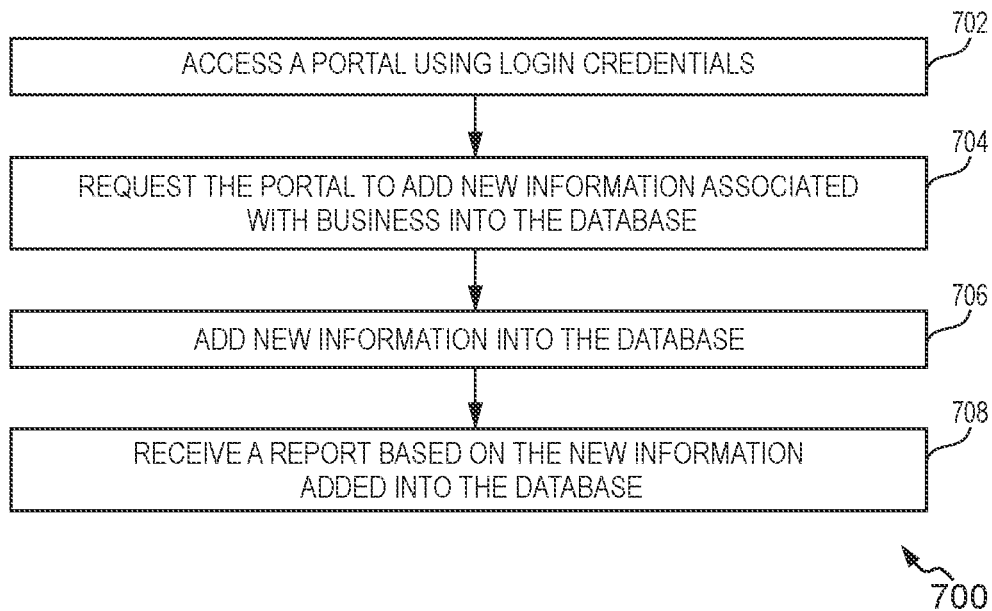
FIGS. 7A-7C show exemplary flowcharts for customized requests or customized business requisitions for adding new information to the database, in accordance with an embodiment of the present disclosure.
Figure 7B:
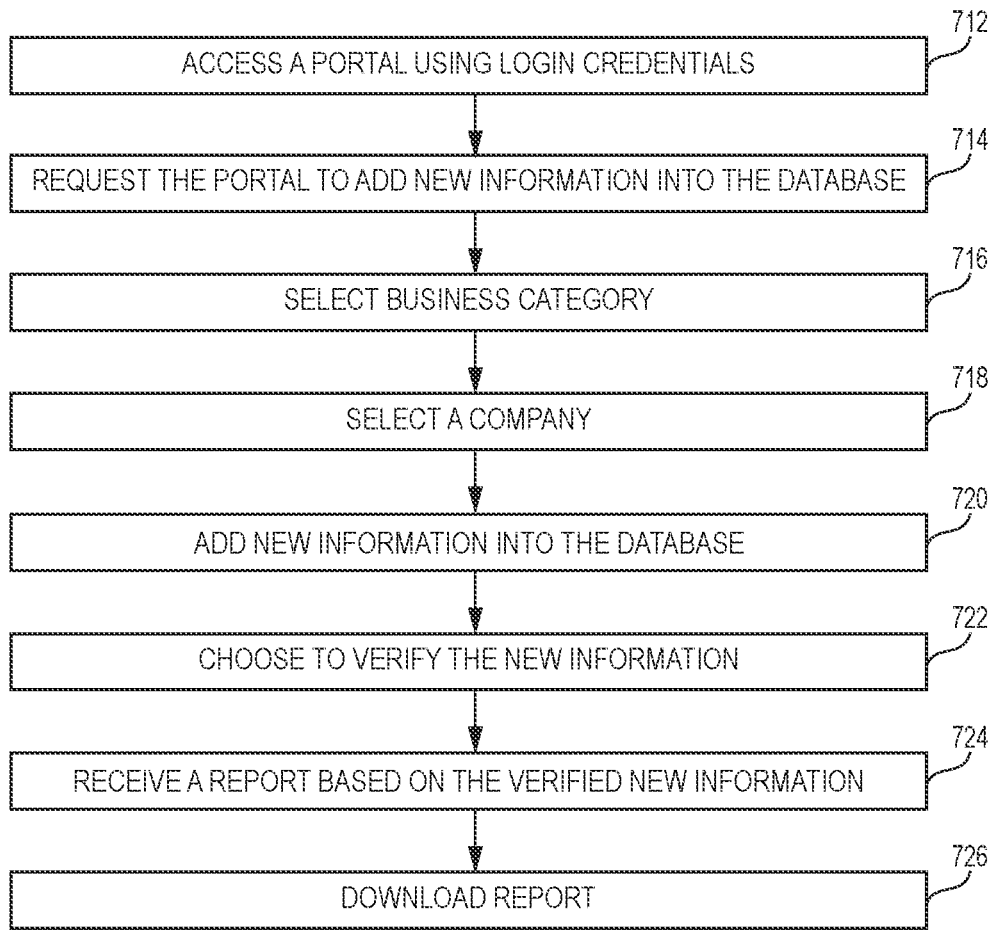
Figure 7C:
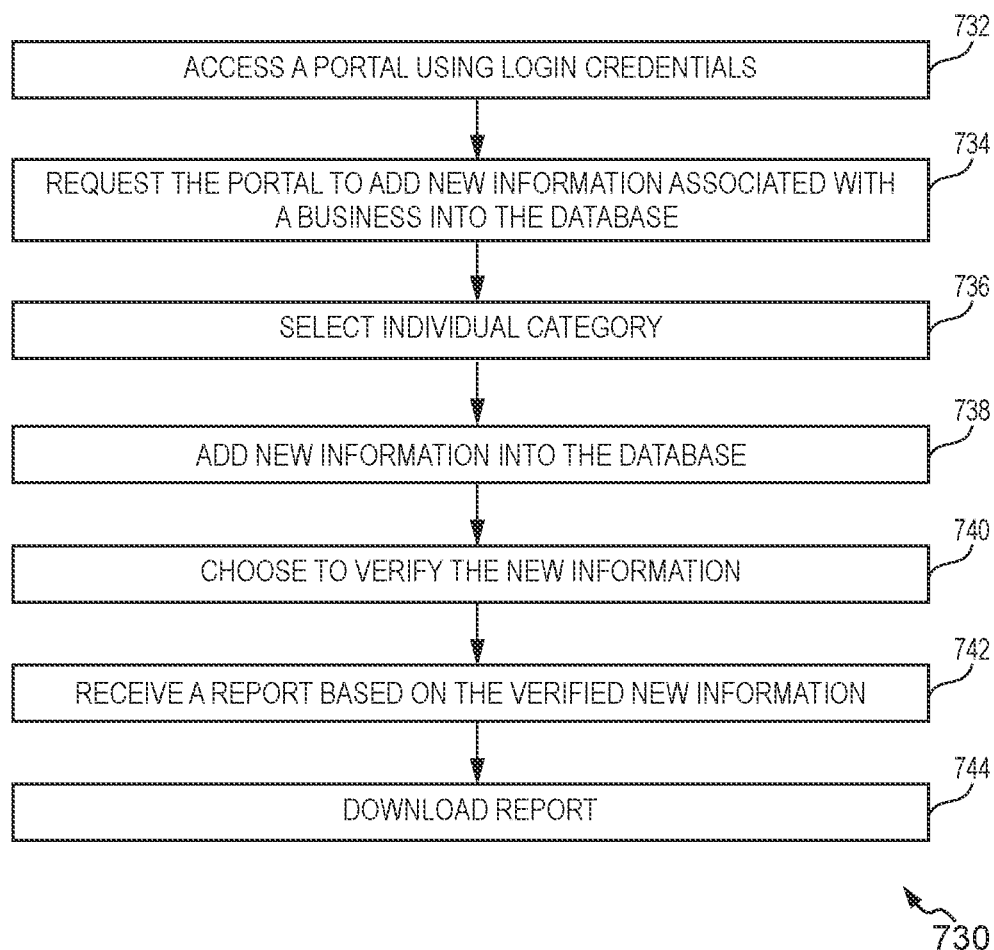

FIGS. 7A-7C show exemplary flowcharts for customized requests or customized business requisitions for adding new information to the database, in accordance with an embodiment of the present disclosure. FIG. 7A is a flowchart 700 for a customized request by an intra-institution for adding new information to the database, in accordance with an embodiment of the present disclosure. The sequence of operations of the flowchart 700 may not be necessarily executed in the same order as they are presented. Further, one or more operations may be grouped and performed in form of a single step, or one operation may have several sub-steps that may be performed in parallel or a sequential manner.

At step 702, a requestor accesses a portal using login credentials. The requestor accesses the portal through a webpage or a mobile application. The portal accessed by the requestor is hosted by the server system 102. In one embodiment, the requestor is a company or a business that requests verification of information associated with the user 104. The login credentials may include user ID, password, date of birth, one-time password (OTP), security questions, and the like.

At step 704, the requestor requests the portal to add new information associated with the business into a database. The new information associated with the business is the information provided by the users 104 to the business. The information provided by the user 104 may include, but not limited to, medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes. In one embodiment, the requestor requests to update the information already present in the database.

At step 706, the portal adds new information to the database. The server system 102 associated with the portal queries the database and adds the new information to the database. The server system 102 reviews if the new information is already present in the database and then adds new information to the database. In one embodiment, the portal associated with the server system 102 updates the already existing information present in the database upon receiving a request to update the information.

At step 708, the requestor receives a report based on the new information added to the database. The report includes a summarized list of existing and the newly added information present in the database, data and time of information added and updated, etc.

FIG. 7B is a flowchart 710 for a customized request by an inter-company for adding new information to the database, in accordance with an embodiment of the present disclosure. The sequence of operations of the flowchart 710 may not be necessarily executed in the same order as they are presented. Further, one or more operations may be grouped and performed in form of a single step, or one operation may have several sub-steps that may be performed in parallel or a sequential manner.

At step 712, a requestor accesses a portal using login credentials. The requestor accesses the portal through a webpage or a mobile application. The portal accessed by the requestor is hosted by the server system 102. In one embodiment, the requestor is a company that requests verification of information associated with the user 104. The login credentials may include user ID, password, date of birth, one-time password (OTP), security questions, and the like.

At step 714, the requestor requests the portal to add new information associated with the company into a database. The new information associated with the company is the information provided by the user 104 to the company. The information provided by the user 104 may include, but not limited to, medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes. In one embodiment, the requestor requests to update the information already present in the database.

At step 716, the requestor selects a business category. The requestor selects the type of the business category on the portal hosted by the server system 102.

At step 718, the requestor selects a company. The requestor selects the type of company based on the business category on the portal hosted by the server system 102.

At step 720, the portal adds new information to the database. The server system 200 queries the database and adds the new information to the database under the selected company. The server system 102 reviews if the new information is already present in the database and then adds new information to the database. In one embodiment, the portal associated with the server system 102 updates the already existing information present in the database upon receiving a request to update the information.

At step 722, the requestor chooses to verify the new information. The server system 102 verifies the authenticity and the credibility of the new information with the business associated with the information.

At step 724, the requestor receives a report based on the new information added to the database. The report includes a summarized list of existing and the newly added information present in the database, data and time of information added and updated, etc.

At step 726, the requestor downloads the report. The requestor downloads the report from the portal onto their systems. In one embodiment, the requestor downloads the report from the portal into their account present in the server system 102.

FIG. 7C is a flowchart 730 for a customized request by an individual for adding new information to the database, in accordance with an embodiment of the present disclosure. The sequence of operations of the flowchart 730 may not be necessarily executed in the same order as they are presented. Further, one or more operations may be grouped and performed in form of a single step, or one operation may have several sub-steps that may be performed in parallel or a sequential manner.

At step 732, a requestor accesses a portal using login credentials. The requestor access the portal through a webpage or a mobile application by signing up with the portal and using login credentials to log into the portal. The portal accessed by the requestor is hosted by the server system 102. In one embodiment, the requestor is an individual who requests verification of information associated with the user 104. The login credentials may include user ID, password, date of birth, one-time password (OTP), security questions, and the like.

At step 734, the requestor requests the portal to add new information associated with a business to the database. The new information associated with the business is the information provided by the user 104 to the business. The information provided by the user 104 may include, but not limited to, medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes. In one embodiment, the requestor requests to update the information already present in the database.

At step 736, the requestor selects individual category. The requestor selects the individual category on the portal hosted by the server system 102. The individual category represents the individual person with requisitions for the business.

At step 738, the portal adds new information to the database. The server system 102 queries the database and adds the new information to the database. The server system 102 reviews if the new information is already present in the database and then adds new information to the database. In one embodiment, the portal associated with the server system 102 updates the already existing information present in the database upon receiving a request to update the information.

At step 740, the requestor chooses to verify the new information. The server system 102 verifies the authenticity and the credibility of the new information with the business associated with the information.

At step 742, the requestor receives a report based on the new information added to the database. The report includes a summarized list of existing and the newly added information present in the database, data and time of information added and updated, etc.

At step 744, the requestor downloads the report. The requestor downloads the report from the portal onto their systems. In one embodiment, the requestor downloads the report from the portal into their account present in the server system 102.

Figure 8A:
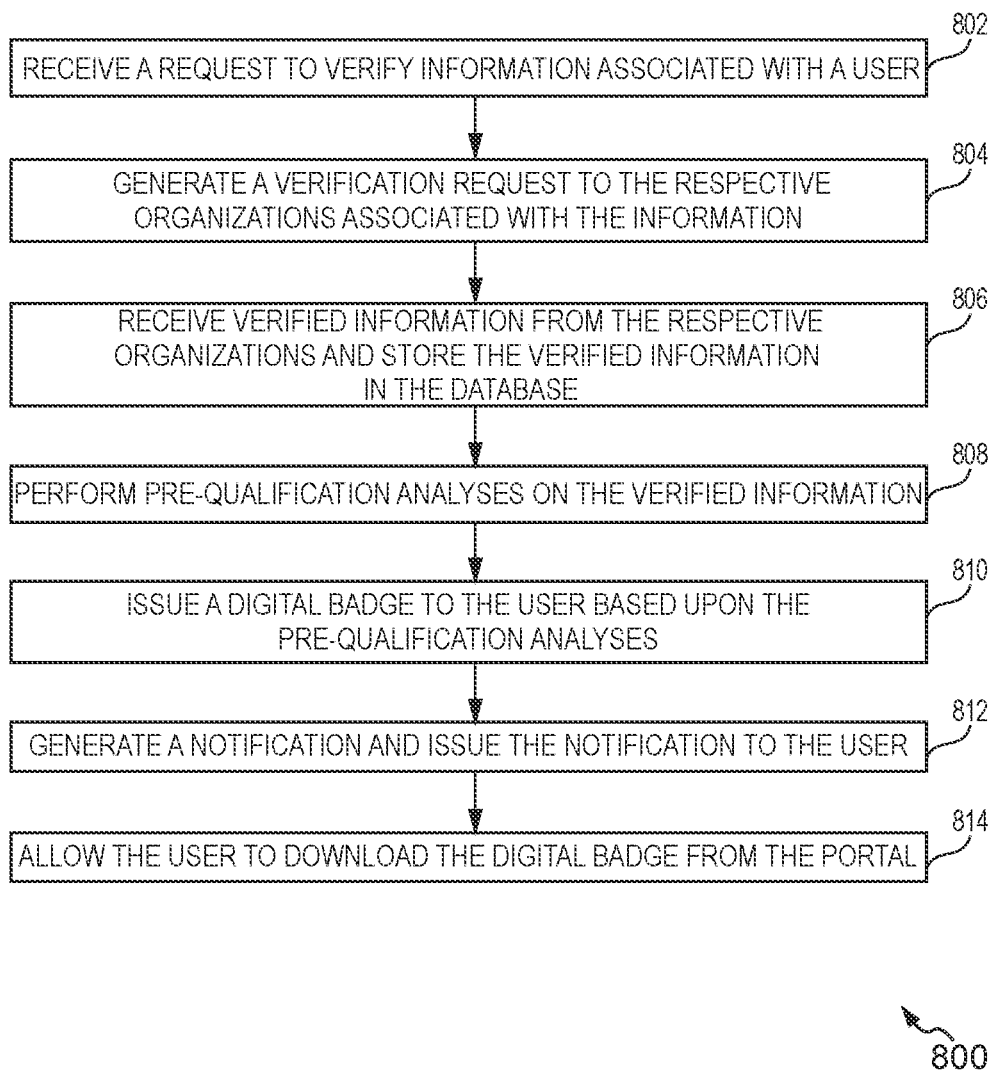
FIGS. 8A-8B show exemplary flowcharts for customized requests or customized individual requisitions from a user, in accordance with an embodiment of the present disclosure.
Figure 8B:
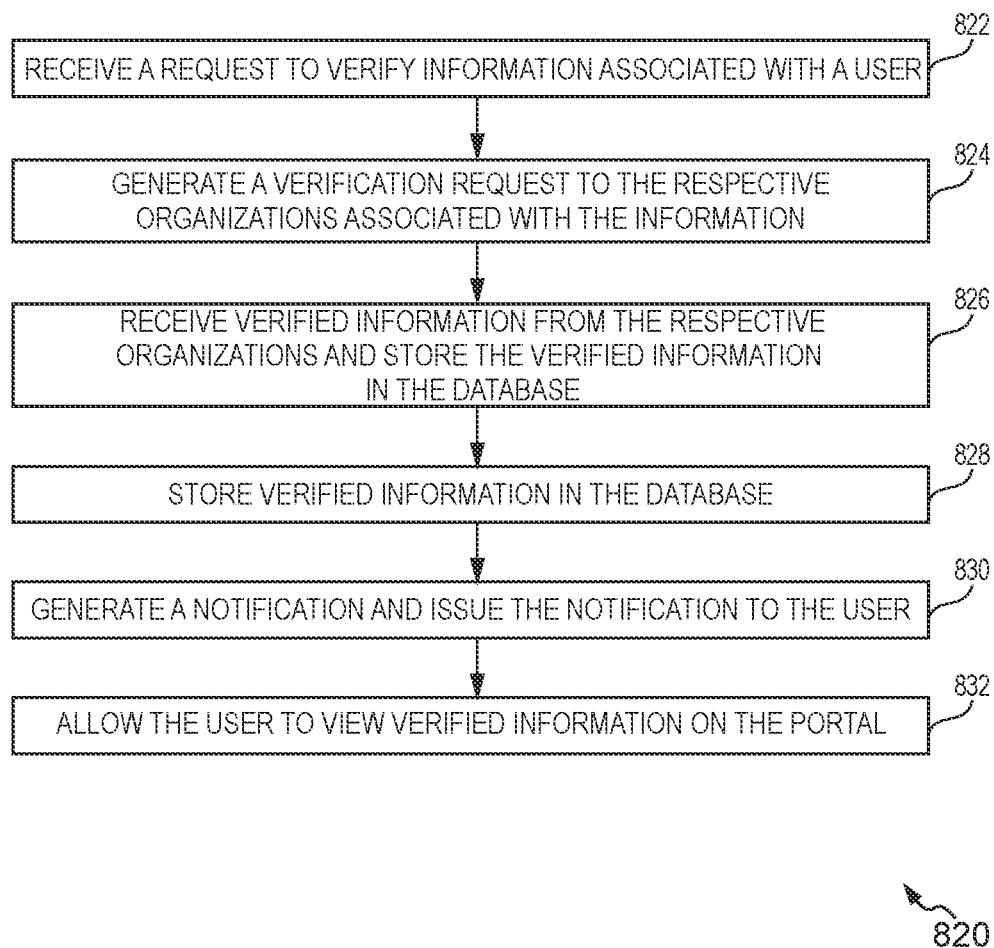

FIGS. 8A-8B shows exemplary flowcharts for customized requests or customized individual requisitions from a user 104, in accordance with an embodiment of the present disclosure. FIG. 8A is a flowchart 800 for a customized request by a subscribed individual for credentialing authenticated information, in accordance with an embodiment of the present disclosure. The sequence of operations of the flowchart 800 may not be necessarily executed in the same order as they are presented. Further, one or more operations may be grouped and performed in form of a single step, or one operation may have several sub-steps that may be performed in parallel or a sequential manner.

At 802, the server system 200 receives a request to verify the information associated with a user 104. The server system 200 receives a request through the portal from the user 104 to verify the information associated with a user 104. In one embodiment, the information associated with the user 104 may include, but is not limited to, medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes.

At 804, the server system 200 generates a verification request to the respective organizations associated with the information. The organization may be one of an educational institution, a foreign education evaluator, a board of medical specialists, a professional designation organization, and the like. The organization refers to a body which issues or provides the information. In one embodiment, the educational institution may authenticate the educational details of the user 104, the foreign education evaluator may authenticate foreign education evaluation, the board of medical specialists may authenticate medical specialty and subspecialty, and the professional designation organization may authenticate professional license, certification, membership, personal identification information, governmental identification information and the like.

At 806, the server system 200 receives verified information from the respective organizations and stores the verified information in the database. The server system 200 updates the request upon receiving the verified information. In some embodiments, the request may be a requisition from an individual.

At 808, the server system 200 performs pre-qualification analyses on the verified information. The pre-qualification analyses determine the credibility of the information of the user 104. In some embodiment, if the information associated with the user 104 is verified to be valid, then the server system 102 conducts a pre-qualification analysis of the information and then stores the verified information in the database before updating the request.

At 810, the server system 102 issues a digital badge to the user 104 based upon the pre-qualification analyses. The digital badge represents that the information associated with the user 104 is credible and authentic.

At 812, the server system 102 generates a notification and issues the notification to the user 104. The notification includes the update on the requisition and the issued digital badge.

At 814, the server system 102 allows the user 104 to download the digital badge from the portal. The user 104 views and downloads the digital badge upon receiving the notification.

FIG. 8B is a flowchart 820 for a customized request by a subscribed individual for credentialing unauthenticated information and by a non-subscribed individual for credentialing both authenticated and unauthenticated information, in accordance with an embodiment of the present disclosure. The sequence of operations of the flowchart 820 may not be necessarily executed in the same order as they are presented. Further, one or more operations may be grouped and performed in form of a single step, or one operation may have several sub-steps that may be performed in parallel or in a sequential manner.

At 822, the server system 200 receives a request to verify the information associated with a user 104. The server system 102 receives a request through the portal from the user 104 to verify the information associated with a user 104. In one embodiment, the information associated with the user 104 may include, but is not limited to, medical certifications and memberships, professional certifications and memberships, educational certifications and memberships, professional and other licenses, transcripts, college degrees, disability status, federal/state/local employment or career status, military veteran status, job readiness, student status, occupational pre-qualifications and qualifications, training, and other demographic and identifying information necessary for verifying, qualifying, pre-qualifying, or identifying individuals for employment, educational programs, licensing, admissions, school/college enrollments, degree programs, career-advancement and changes, benefits, and any other government, business, education, or personal purposes.

At 824, the server system 102 generates a verification request to the respective organizations associated with the information. The organization may be one of an educational institution, a foreign education evaluator, a board of medical specialists, a professional designation organization, and the like. The organization refers to a body that issues or provides the information. In one embodiment, the educational institution may authenticate the educational details of the user 104, the foreign education evaluator may authenticate foreign education evaluation, the board of medical specialists may authenticate medical specialty and subspecialty, and the professional designation organization may authenticate professional license, certification, membership, personal identification information, and governmental identification information and the like.

At 826, the server system 102 receives verified information from the respective organizations. The server system 102 updates the request upon receiving the verified information. In some embodiments, the request may be a requisition from an individual.

At 828, the server system 102 stores the verified information in the database.

At 830, the server system 102 generates a notification and issues the notification to the user 104. The notification includes the update on the requisition.

At 832, the server system 102 allows the user 104 to view verified information on the portal.

Figure 9:
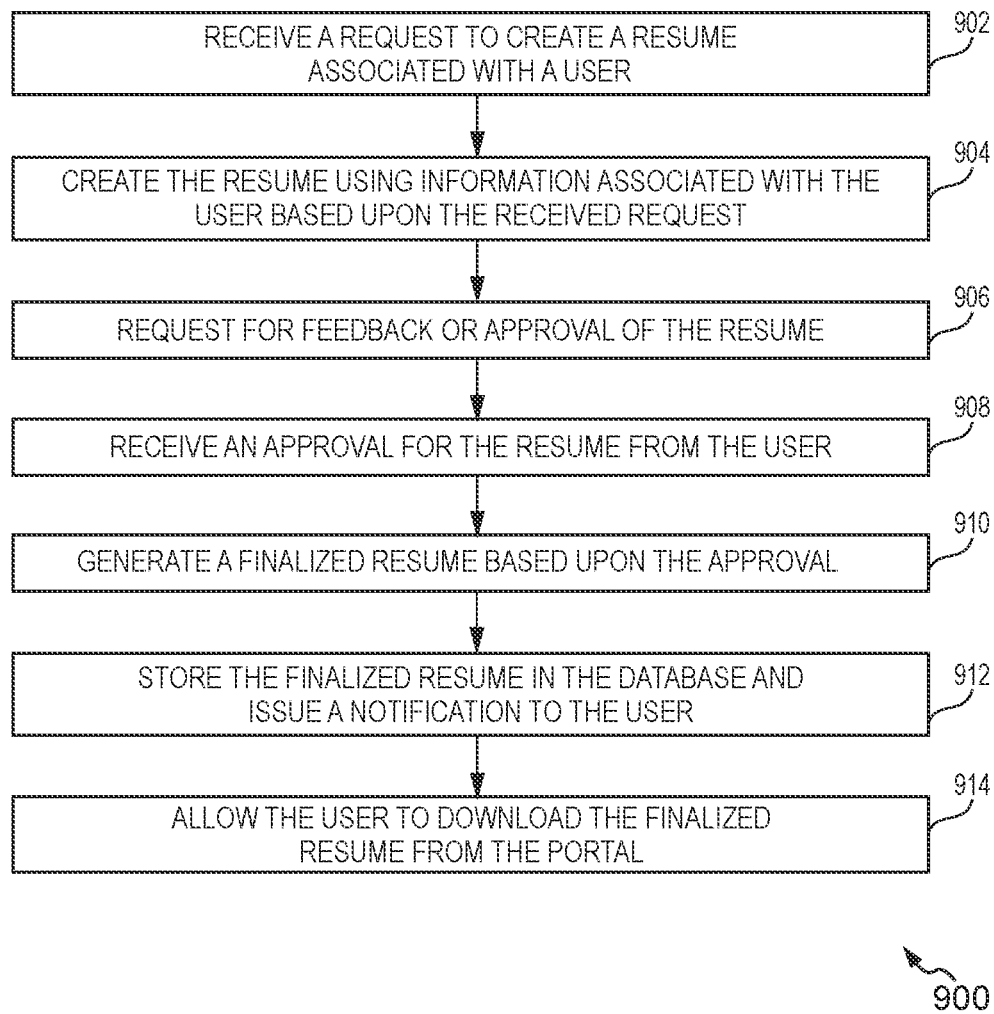
FIG. 9 is a flow chart for creating a resume associated with the user based on the verified information, in accordance with an embodiment of the present disclosure.

FIG. 9 is a flowchart 900 for creating a resume associated with the user 104 based on the verified information, in accordance with an embodiment of the present disclosure. The sequence of operations of the flowchart 900 may not be necessarily executed in the same order as they are presented. Further, one or more operations may be grouped and performed in form of a single step, or one operation may have several sub-steps that may be performed in parallel or a sequential manner.

At 902, the server system 102 receives a request to create a resume associated with a user 104. The user 104 sends a request through the portal to the server system 200 to create a resume based on the verified information. The resume may be one of an educational resume, a professional resume, and the like.

At 904, the server system 102 creates the resume using information associated with the user 104 based upon the received request. In one embodiment, the server system 200 generates a resume based on the stored verified information present in the database based on one or more fixed templates. In one embodiment, the server system 200 may use artificial intelligence and machine learning technologies to generate the resume.

At 906, the server system 102 requests feedback or approval of the resume. The server system 200 requests the user 104 for feedback on any changes or edits to be made, or if any more information needs to be added, or if a different template needs to be used, etc. In one embodiment, the server system 200 may request the user 104 for the approval of the created resume if the resume is as per user 104 specifications.

At 908, the server system 102 receives an approval for the resume from the user 104. The user 104 provides an approval if they are satisfied with the resume that has been generated by the system. In one embodiment, upon the user 104 providing the approval, a token may be generated which is sent to the server system 102. In one embodiment, the user 104 may provide feedback to add additional information, update or delete information associated with the user 104 in the generated resume.

At 910, the server system 102 generates a finalized resume based upon the approval. The server system 102 generates finalized resume when the user 102 provides an approval when they are satisfied with the generated resume. In one embodiment, the server system 102 updates the resume if the user 104 provides feedback to add additional information, update or delete information associated with the user 104 in the generated resume. The server system 102 instills the changes provided in the feedback and generates a finalized resume.

At 912, the server system 102 stores the finalized resume in the database and issues a notification to the user 104. The notification includes a message that the resume is generated and is ready for download.

At 914, the server system 102 allows the user 104 to download the finalized resume from the portal.

Figure 10A:
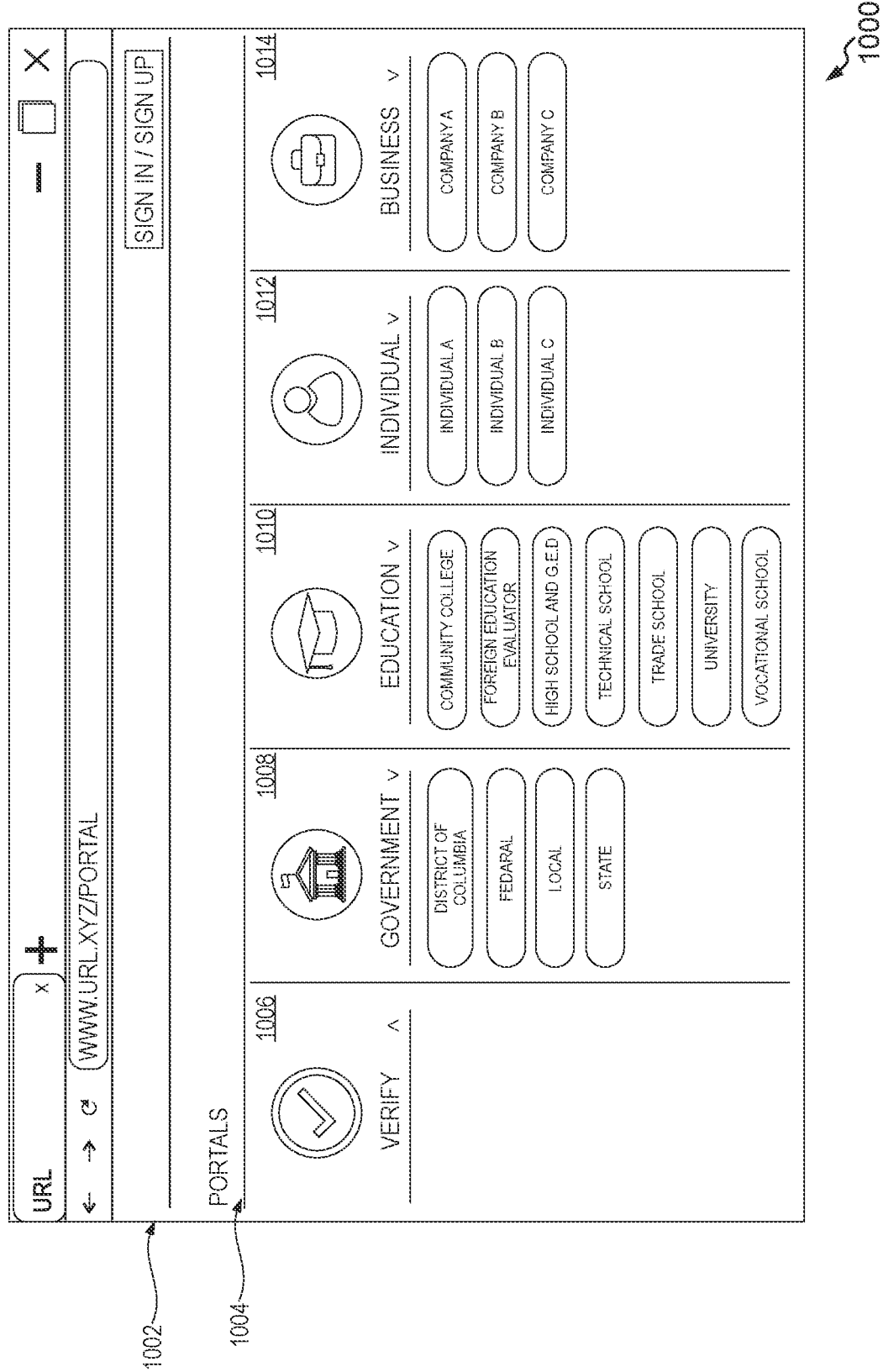
FIG. 10A depicts an exemplary user interface (UI) of a webpage associated with the digital platform, in accordance with the embodiments of the present disclosure.

FIG. 10A depicts an exemplary user interface (UI) 1000 of a webpage associated with the digital platform, in accordance with the embodiments of the present disclosure.

The UI 1000 depicts a webpage 1002 displaying a plurality of portals and sub-portals 1004. The plurality of portals may include go verify/verification portal 1006, government portal 1008, education portal 1010, individual portal 1012, and business portal 1014. For example, the government portal 1008 may include a plurality of sub-portals consisting of agencies such as District of Columbia, federal, local, state, etc. Similarly, the individual portal 1012 and the business portal 1014 may include multiple sub-portals for each individual and each organization. In FIG. 10, the business portal 1014 is shown to include a portal for Company A, Company B, and Company C for exemplary purposes, however, more than three sub-portals can be included in a portal. A user may have its portal and datasets shared between another, which may be defined by shared portal agreements (SPAs). The SPAs may include multiple access levels that have various access rights to internal or external portals. The access levels can be redefined by the go verify system based on user requests. Each portal may have internal agreements and external agreements. The internal agreements may provide access to datasets and other existing verified data within an organization or sub-organization. The access to the portal is restricted to a user unless the portal provides specialized access through their SPAs. Similarly, the external agreements provide access to datasets and other existing verified data outside an organization or sub-organization. For example, a federal government user from the Department of Defense (DOD) will not have access to the Department of Agriculture's (USDA) dataset of verified employees without a SPA. A typical level 1 SPA could grant a DOD user access to the USDA's dataset information strictly to obtain verified employment data of a USDA employee tentatively hired by DOD.

The education portal 1010 may include a plurality of educational institutions such as community college, foreign education evaluator, high school and G.E.D, technical school, trade school, university, vocational school, etc. The business portal 1014 may include a type of business such as a company, licensing board, non-profit, etc. The webpage displays a signup/sign-in button using which the user 104 or an organization can create an account and log in to access the portals, generate requisitions, and view reports.

Figure 10B:
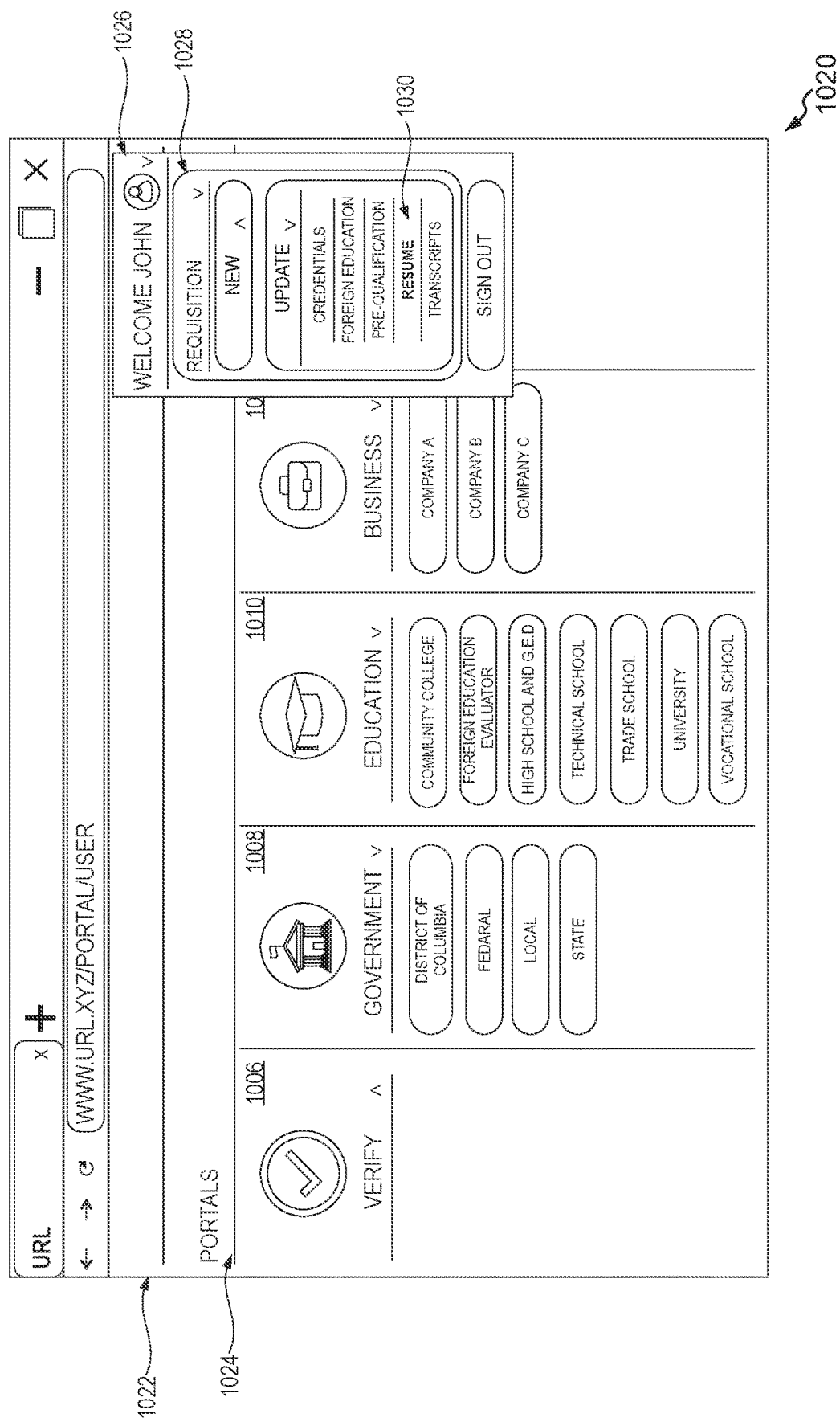
FIG. 10B depicts an exemplary UI of the webpage updated upon a user signing into the digital platform, in accordance with the embodiments of the present disclosure.

FIG. 10B depicts an exemplary user interface (UI) 1020 of the webpage 1022 updated upon a user signing into the digital platform, in accordance with the embodiments of the present disclosure.

The UI 1020 depicts a webpage 1022 displaying a plurality of portals and sub-portals 1024. The plurality of portals and sub-portals 1024 may include the go verify/verification portal 1006, the government portal 1008, the education portal 1010, the business portal 1014, and their respective sub-portals, similar to the plurality of portals and sub-portals 1004. The UI 1020 further depicts a user portal when a user has logged/signed in to the digital platform, in this case, the user is 'John'. The plurality of portals and sub-portals 1024 does not show the individual portal 1012 since a user has logged into the individual portal 1012. For example, the user 'John' clicks on the individual portal 1012 on the UI 1000 and enters his credentials when prompted to access his individual portal. The UI 1020 indicates that login/sign in was successful by showing the text 'WELCOME JOHN' adjacent to an icon including an avatar or profile picture of the user. The icon and the text are collectively represented by 1026, which is clickable by the user. Upon clicking on the representation 1026, a list of options associated with the user is dropped down and the list of options associated with the user are requisition 1028 and sign out. The list of options is shown to include two options (such as the requisition 1028 and sign out) for exemplary purposes, however, in other embodiments and to other users, more than two options (such as payment and download report, etc.) can be included in the list of options. The requisition 1028 is a clickable option that drops down types of requests upon clicking such as new and update. Further, new and update options are clickable by the user to raise a request related to a parameter. Each of the new and update options drops down a list of options upon clicking and may include parameters such as credentials, foreign education, pre-qualification, resume, and transcripts. For example, in FIG. 10B, 'John' initially clicks on requisition 1028 to make an update request related to a resume which is bolded 1030 upon selection by 'John'. The parameters available to 'John' related to which requests can be raised are shown to be credentials, foreign education, pre-qualification, resume, and transcripts, however, different users can have different parameters and options available/shown to them in their respective portals based on their type of subscription to the digital platform.

A UI similar to the UI 1020 would be constructed to depict other portals/sub-portals such as the go verify/verification portal 1006, the government portal 1008, education portal 1010, and business portal 1014 for the respective type of users.

The disclosed methods with reference to FIGS. 3-9, or one or more operations of the server system 102 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer, such as a laptop computer, netbook, Webbook, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal-oxide-semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g. magneto-optical disks), CD-ROM (compact disc read-only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
   receiving and processing, by a server system, a request to verify information associated with a user the request comprising of credentials of the user of a digital platform for employment and education purposes, wherein the digital platform comprises one or more portals associated with one or more users and one or more government, business, or educational organizations authorized to authenticate information associated with the user through inter and intra portal access and shared portal agreements; and
   wherein the one or more users or one or more government, business, or educational organizations do not have to be paid subscribers and are issued free registration information to authenticate requested data through an assigned or shared portals, or wherein the one or more users or one or more government, business, or educational organizations is voluntarily subscribed or invited to subscribe to the full employment and educational functions of the digital platform;
   determining, by the server system, whether the information is present in a database associated with the digital platform, the determining comprising querying the database based on the credentials of the user;
   upon determining that the information is present in the database, verifying, by the server system, the information by comparing the information with datasets stored in the database;
   upon determining that the information is not present in the database, generating, by the server system, authentication requests for verification of the information, wherein each of the authentication requests is generated for verification of at least a part of the information, wherein the part of the information has to be verified by one or more government, business, or educational organizations registered with or subscribed to the digital platform, and wherein each of the authentication requests and results is sent in a variety of accessible formats to a respective portal associated with the one or more government, business, or educational organizations;

enabling display, by the server system, of the authentication request on the respective portal via a device associated with the one or more government, business, or educational organizations;

receiving, by the server system, verified information from the one or more government, business, or educational organizations and storing the verified information in the database; and generating, by the server system, a report based on the verified information, the report comprising an output of the verification;

performing, by the server system, pre-qualification analyses on the verified information;

upon performing pre-qualification analyses, issuing, by the server system, a digital badge to the user, wherein the digital badge validates the verified information; and generating, by the server system, a notification based upon the issuing of the digital badge, wherein the notification notifies the user that the digital badge has been issued and is available for download from a portal of the user.

2. The computer-implemented method as claimed in claim 1, wherein generating the report comprises generating the report based on the verified information.

3. The computer-implemented method as claimed in claim 1, wherein the information comprises data corresponding to at least one of medical certification, professional certification, educational certification, professional license, transcript, college degree, disability status, federal/state/local employment status, occupational pre-qualification and qualification determinations, training, personal identification information, and governmental identification information.

4. The computer-implemented method as claimed in claim 1, wherein the report comprises data indicative of an outcome of the verification of the information, and wherein the outcome is defined as positive or negative based on the accuracy of the information.

5. The computer-implemented method as claimed in claim 1, wherein the credentials of the user comprise at least one of a user ID, a password, date of birth, one-time password (OTP), and security questions.

6. The computer-implemented method as claimed in claim 1, further comprising:
receiving, by the server system, a request to create a resume associated with a user;
generating, by the server system, the resume based on the verified information;
sending, by the server system, a request for at least one of feedback and approval of the generated resume;
receiving, by the server system, approval for the resume from the user; and generating, by the server system, a finalized resume based on the approval provided by the user.

7. The computer-implemented method as claimed in claim 6, further comprising:

receiving, by the server system, feedback from the user regarding the generated resume;
and
updating, by the server system, the generated resume based on the feedback.

8. The computer-implemented method as claimed in claim 1, further comprising:
monitoring, by the server system, validity of one or more certifications and licenses associated with the user;
sending, by the server system, a notification to the user upon detection of expiry of the one or more certifications or licenses; and
adjusting, by the server system, the status or level of the digital badge as applicable to the one or more expired certifications or licenses.

9. A server system, comprising:
a communication interface;
a memory; and
a processor communicably coupled to the communication interface and the memory, the processor configured to execute the machine-readable instructions to cause the server system at least in part to:
receive and process a request to verify information associated with a user, the request comprising credentials of the user for a digital platform, wherein the digital platform comprises one or more portals associated with respective one or more users and one or more government, business, or educational organizations authorized to authenticate information associated with the user through inter and intra portal access and shared portal agreements; and
wherein the one or more users or one or more government, business, or educational organizations do not have to be paid subscribers and are issued free registration information to authenticate requested data through an assigned or shared portals, or wherein the one or more users or one or more government, business, or educational organizations is voluntarily subscribed or invited to subscribe to the full employment and educational functions of to the digital platform;
determine whether the information is present in a database associated with the digital platform, the determining comprising querying the database based on the credentials of the user; upon determining that the information is present in the database, verify the information by comparing the information with datasets stored in the database;
upon determining that the information is not present in the database, generate authentication requests for verification of the information, wherein each of the authentication requests is generated for verification of at least a part of the information, wherein the part of the information has to be verified by one or more government, business, or educational organizations registered with or subscribed to the digital platform, and wherein each of the authentication requests and results is sent to in a variety of accessible formats to a respective portal associated with the one or more government, business, or educational organizations;
enable display of the authentication request on the respective portal via an entity device associated with the one or more government, business, or educational organizations;
receive verified information from the respective one or more one or more government, business, or educational organizations and store the verified information in the database; and generate a report based on the verified information, the report comprising an output of the verification;

perform pre-qualification analyses on the verified information;

upon performing pre-qualification analyses, issue a digital badge to the user, wherein the digital badge validates the verified information; and generate a notification based upon the issuing of the digital badge, wherein the notification notifies the user that the digital badge has been issued and is available for download from a portal of the user.

10. The server system as claimed in claim 9, wherein generation of the report comprises generating the report based on the verified information.

11. The server system as claimed in claim 9, wherein the information comprises data corresponding to at least one of medical certification, professional certification, educational certification, professional license, transcript, college degree, disability status, federal/state/local employment status, occupational pre-qualification and qualification determinations, training, personal identification information, and governmental identification information.

12. The server system as claimed in claim 9, wherein the report comprises data indicative of an outcome of the verification of the information, and wherein the outcome is defined as positive or negative based on the validity of the information.

13. The server system as claimed in claim 9, wherein the credentials of the user comprise at least one of a user ID, a password, date of birth, one-time password (OTP), and security questions.

14. The server system as claimed in claim 9, wherein the server system is further caused, at least in part, to:

receive a request to create a resume associated with the user;

generate the resume based on the verified information;

send a request for at least one of feedback and approval of the generated resume;

receive an approval for the generated resume from the user; and generate a finalized resume based upon the approval provided by the user.

15. The server system as claimed in claim 14, wherein the server system is further caused, at least in part, to:

receive feedback from the user regarding the generated resume; and update the generated resume based on the feedback.

16. The server system as claimed in claim 9, wherein the server system is further caused, at least in part, to:

monitor validity of one or more certifications and licenses associated with the user;

send a notification to the user upon detection of expiry of the one or more certifications or licenses; and adjust the status or level of the digital badge as applicable to the one or more expired certifications or licenses.

\* \* \* \* \*